United States Patent [19]

Eaves

[11] Patent Number: 5,656,915

[45] Date of Patent: Aug. 12, 1997

[54] MULTICELL BATTERY PACK BILATERAL POWER DISTRIBUTION UNIT WITH INDIVIDUAL CELL MONITORING AND CONTROL

[76] Inventor: Stephen S. Eaves, 9 General Stanton Dr., Charlestown, R.I. 02813

[21] Appl. No.: 519,662

[22] Filed: Aug. 28, 1995

[51] Int. Cl.⁶ .................................................. H01M 10/46
[52] U.S. Cl. ............................. 320/6; 320/15; 320/18
[58] Field of Search ......................... 320/5, 6, 7, 15, 320/16, 17, 18, 39, 48

[56] References Cited

U.S. PATENT DOCUMENTS

| | | | |
|---|---|---|---|
| 5,153,496 | 10/1992 | LaForge | 320/17 |
| 5,206,578 | 4/1993 | Nor | 320/18 X |
| 5,218,284 | 6/1993 | Burns et al. | 320/14 |
| 5,313,152 | 5/1994 | Wozniak et al. | 320/6 |
| 5,498,950 | 3/1996 | Ouwerkerk | 320/18 |
| 5,504,415 | 4/1996 | Podrazhansky et al. | 320/18 |
| 5,539,297 | 7/1996 | Fiebig | 320/15 |

Primary Examiner—Edward Tso

[57] ABSTRACT

A power distribution unit (PDU) for series connected multicell battery packs which uses a common hardware platform for both charging and providing power to an external load. Using switching circuitry (2), and tap points ($5a, 5b, 5c, 5d, 5e$) individual access to cells ($4a, 4b, 4c, 4d$) or groups of series connected cells is accomplished. Under control of microcontroller circuitry (1), series connected cell groups of varying sizes are selected and prioritized for connection to a common power bus (29), (30) at real-time speeds. The PDU uses these groups to maintain balance over cells with varying characteristics, adapt to varying charge sources and to produce a regulated output voltage during discharge.

16 Claims, 15 Drawing Sheets

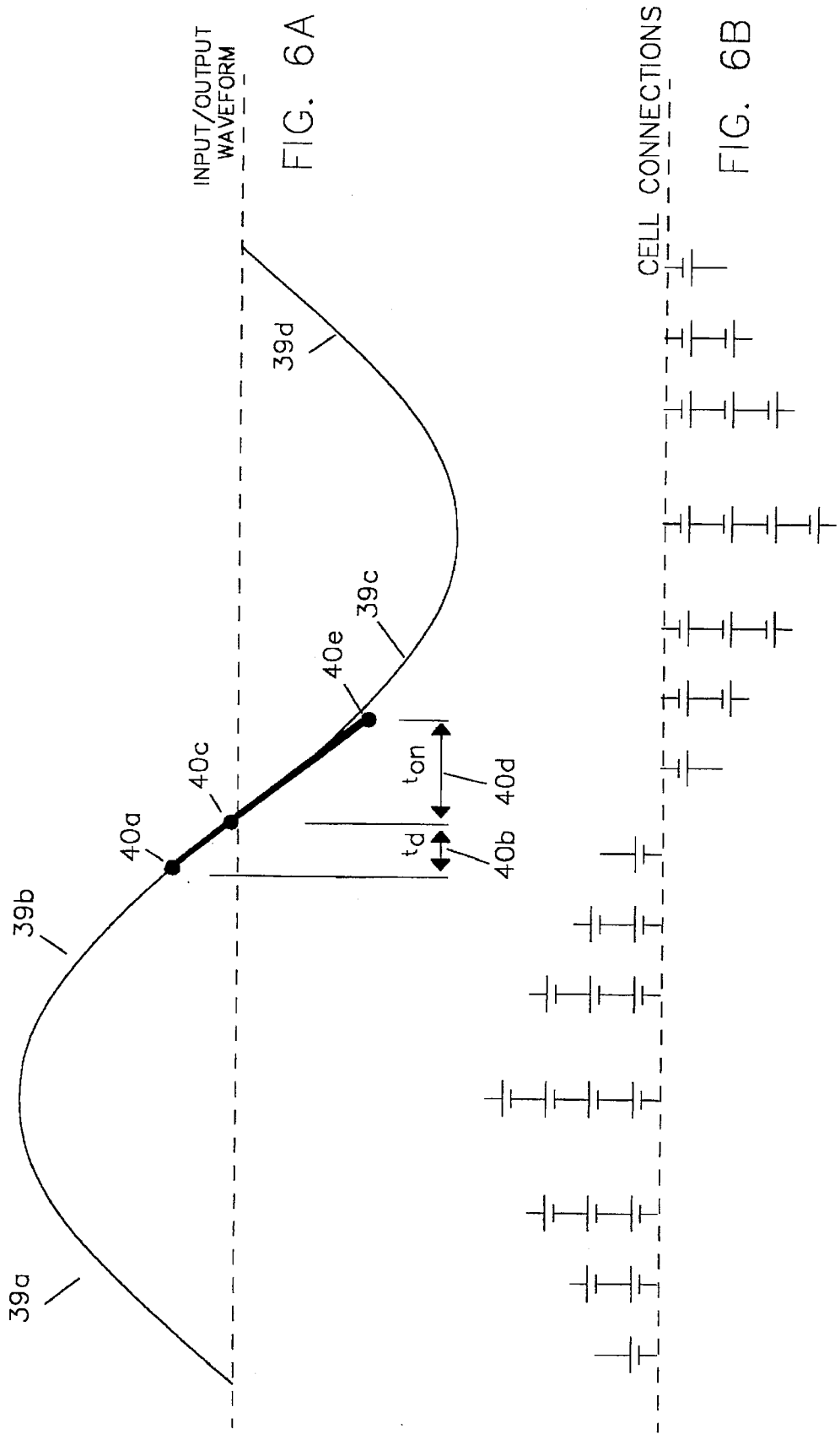

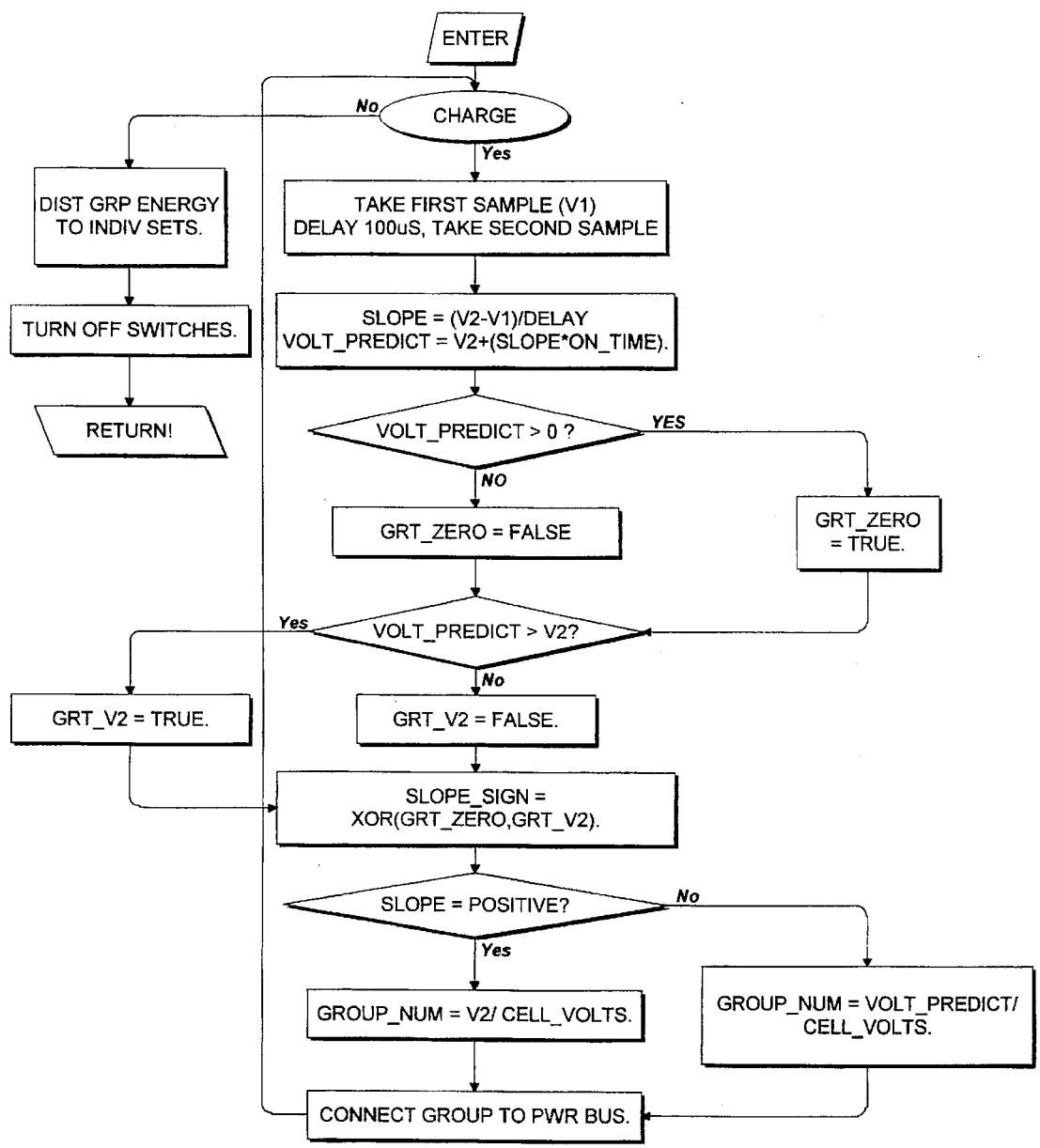
Fig. 7, CHARGE

Fig. 8, PAM/PWM DISCHARGE
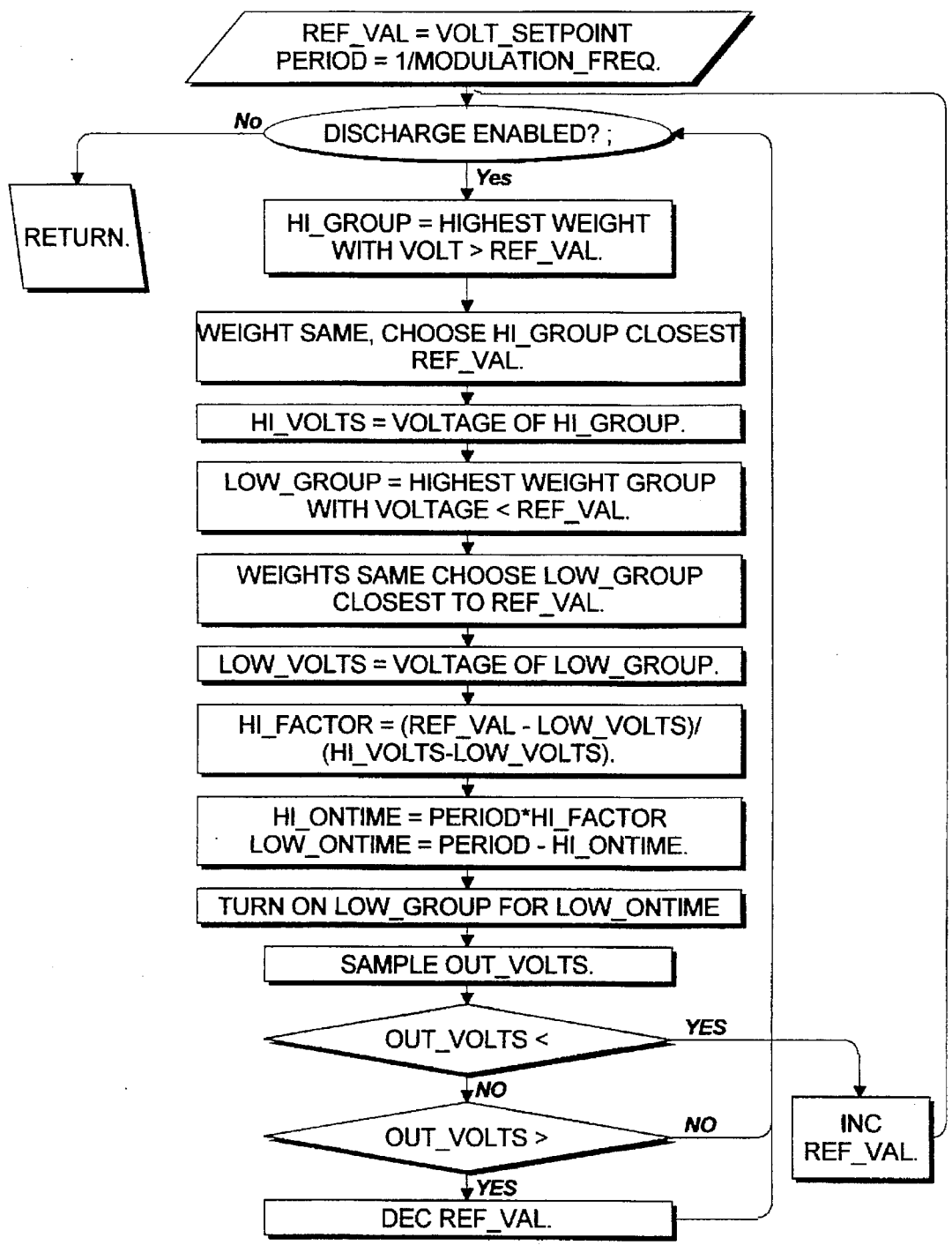

Fig. 9, SINEWAVE OUTPUT ROUTINE
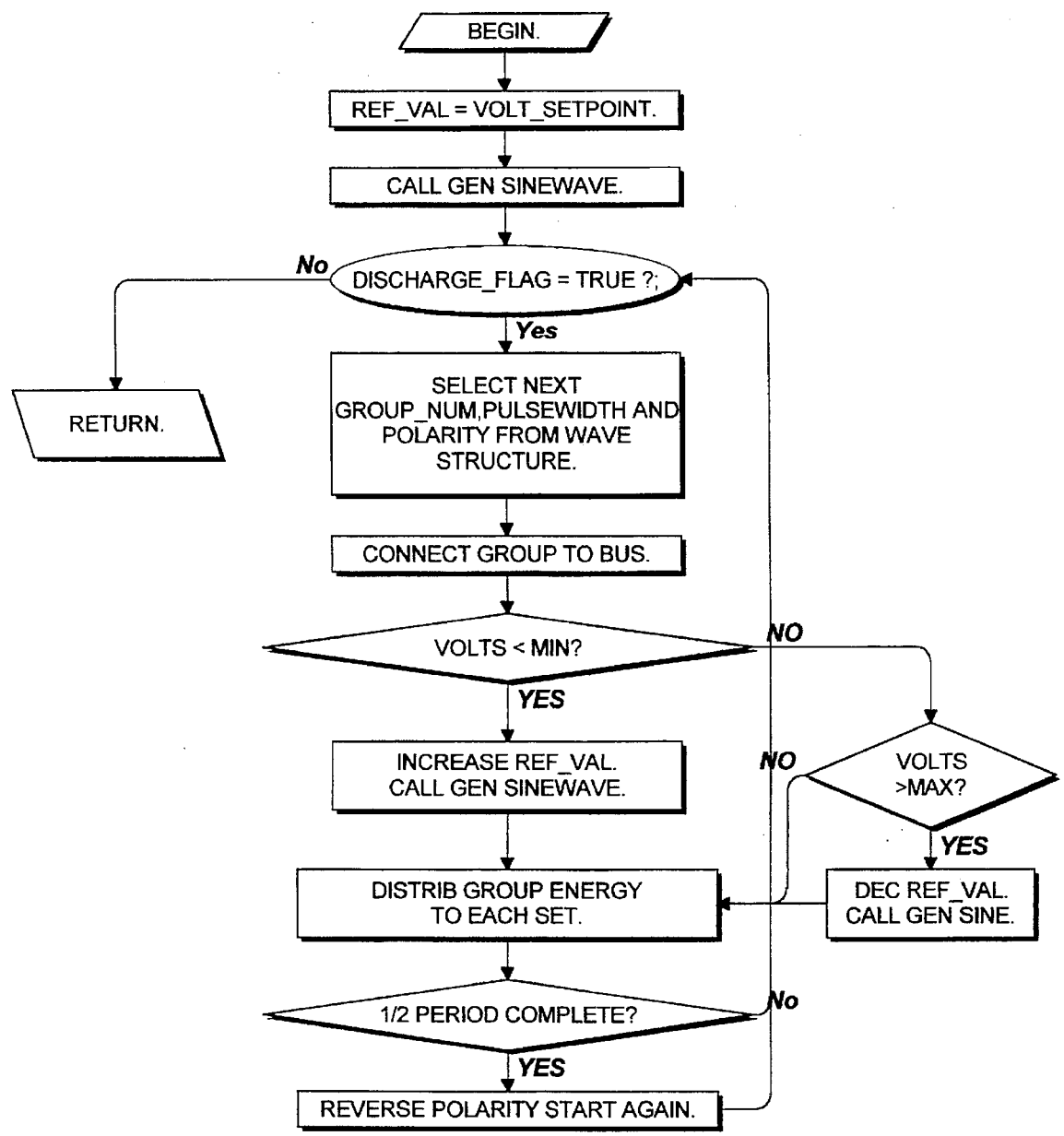

Fig. 10, GENERATE SINEWAVE STRUCTURE
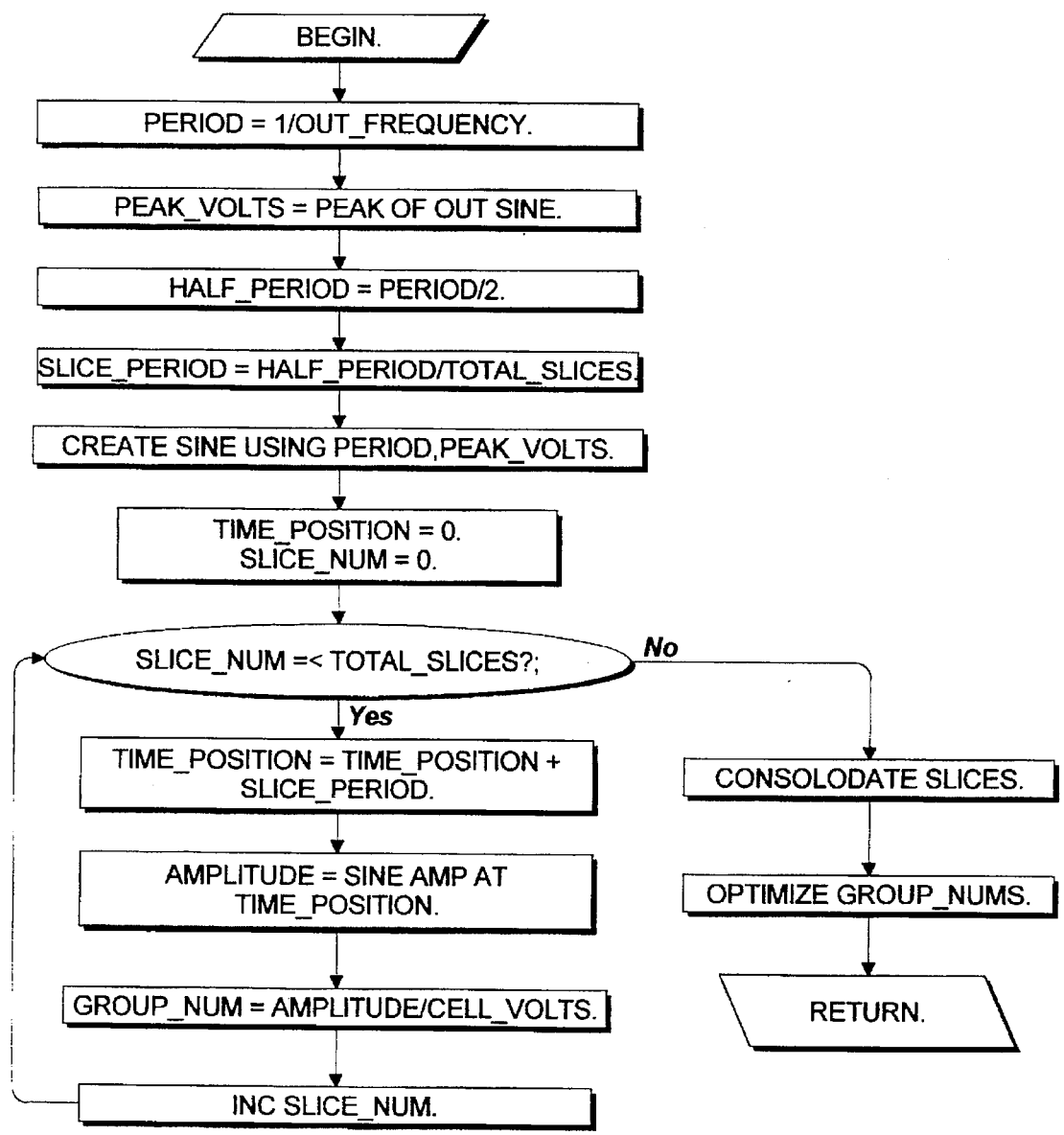

Fig. 11, EQUALIZE FUNCTION.
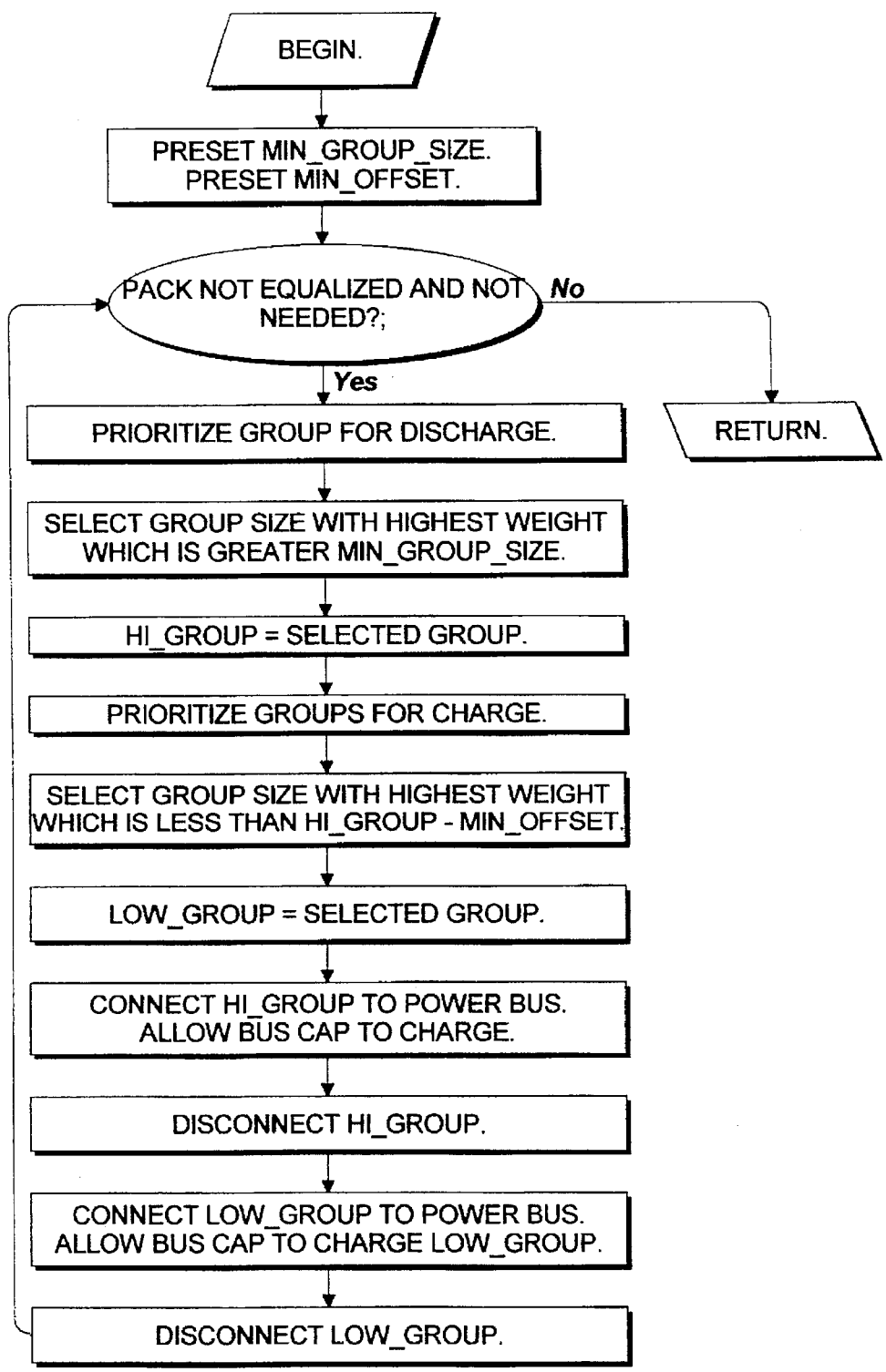

Fig 12, CALCULATE PACK STATISTICS.
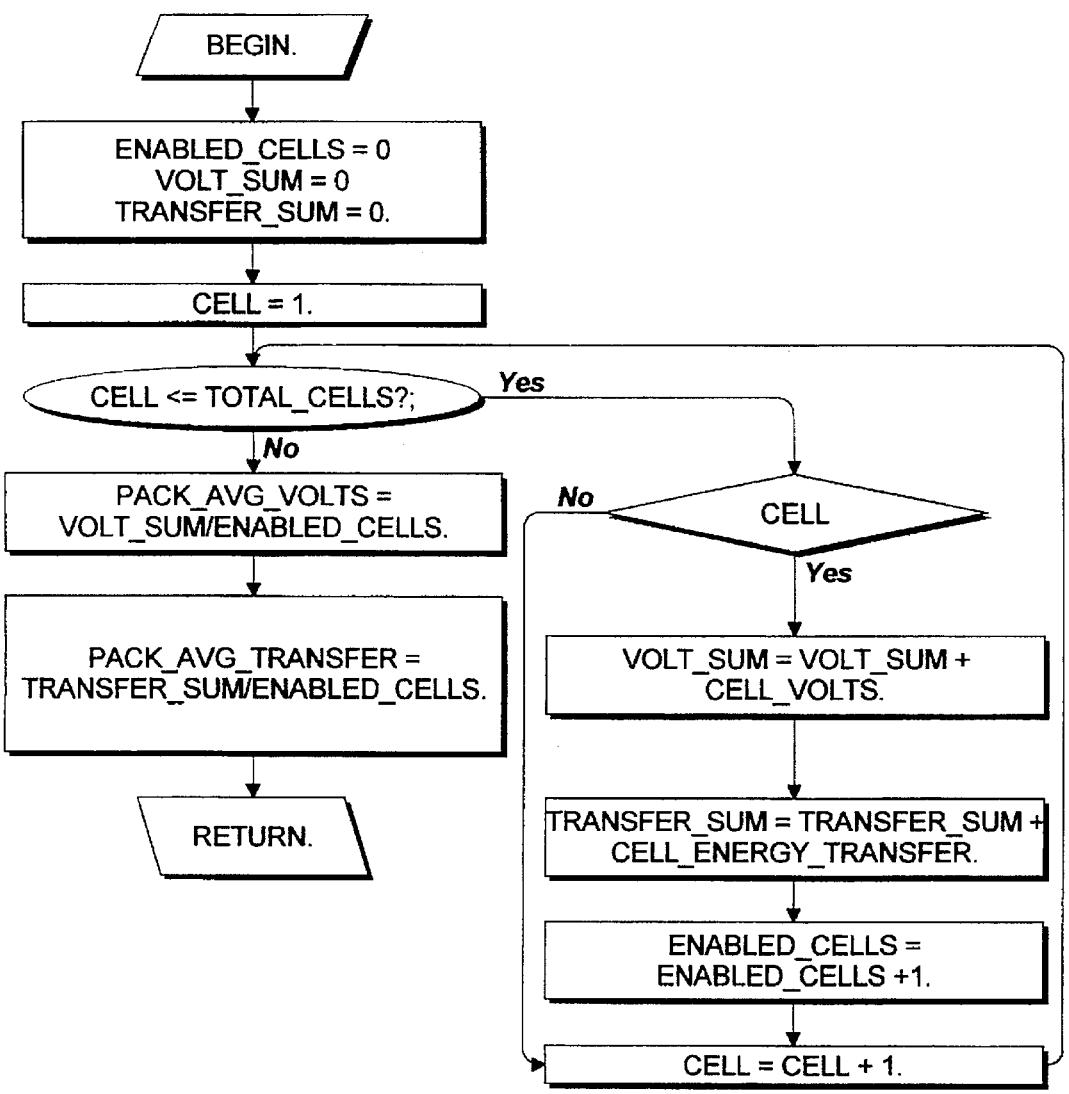

Fig. 13, ASSIGN WEIGHT FACTOR.
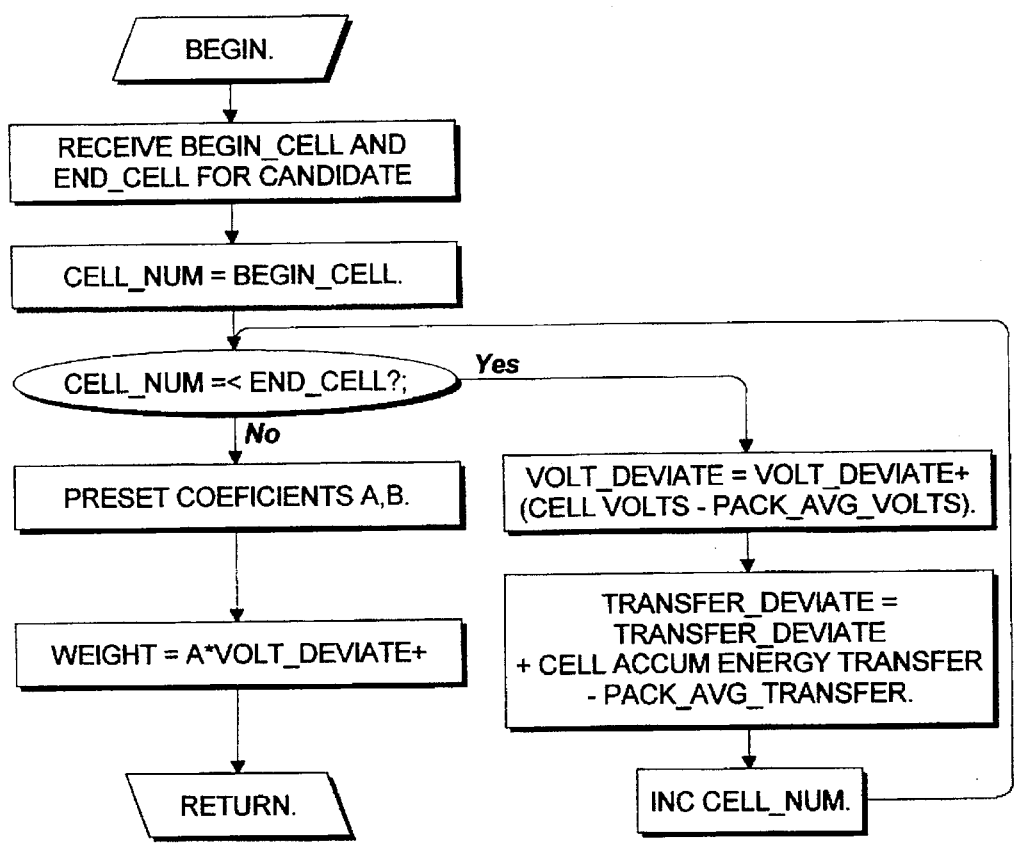

MULTICELL BATTERY PACK BILATERAL POWER DISTRIBUTION UNIT WITH INDIVIDUAL CELL MONITORING AND CONTROL

BACKGROUND—FIELD OF INVENTION

This invention relates to the field of multicell battery pack monitoring and control, specifically it is a method and device for providing a bilateral converter which allows individual control of cells within the pack for the purpose of charge and discharge.

BACKGROUND—DESCRIPTION OF PRIOR ART

In order to produce practical output voltages, rechargeable batteries are typically configured as series connected packs. During charging of these packs, inherent differences in the capacity of individual cells causes the lower capacity cells to reach end of charge first, and then overcharge. Depending on the ability of the cell chemistry to tolerate this overcharge, cell damage may occur. During discharge, a similar problem is encountered when the lower capacity cells reach minimum voltages first and overdischarge. Cell chemistries such as lead-acid and nickel-cadmium can tolerate moderate forms of these conditions, while others such as silver-zinc and lithium-ion are more easily damaged. The probability of damage due to overcharge is further aggravated by demand for rapid charging systems which run at higher currents and cell temperatures.

Cells that fail in an open circuit state completely disable a series connected pack, while closed circuit failures become a resistive load which robs energy from the remaining cells. A number of prior art devices have been developed to bypass a cell failure. Devices typically entail a switch means which when closed, redirects current around the failed cell. Since each bypass switch is required to carry the full series current of the pack, the cost and space requirements quickly become prohibitive.

There is a real need for a system which can counteract cell imbalance, and ideally bypass a failed cell. Presently, chemistries such as silver-zinc and lithium-ion have significantly higher energy density over nickel-cadmium batteries but are disadvantaged by higher incidents of cell failure.

A system which counteracts cell imbalance is disclosed by Laforge in U.S. Pat. No. 5,153,496. LaForge employs a selectable bypass circuit for charging cells which reach end of charge before others in the pack. LaForge protects battery cells from overdischarge by signaling when the lowest capacity cell has a terminal voltage which has dropped below a minimum value. The invention disclosed by LaForge achieves charge equalization using relatively simple circuitry, and indeed, this was specifically disclosed as his intent. However, the arrangement requires the dissipation of charge energy through bypass resistors causing a loss in efficiency. During discharge the invention of LaForge only signals for a shutdown of the pack when the weakest capacity cell is fully discharged, forfeiting the energy in the remaining cells. Another useful function of the invention of LaForge is a maintenance mode where the cells in the pack are shunted through a load until they are completely discharged. This removes any polarization or "memory effect" from the cells left by shallow discharges. Cell polarization can cause a rectifiable but significant reduction in capacity for chemistries such as NiCd. The disadvantage LaForge's method is that cell energy is lost from the pack, and the pack is left in an unusable state until it is recharged.

Hence, the invention of LaForge uses somewhat passive means to achieve its objective at the cost of charging efficiency and loss of potential pack energy. The bypass capabilities of LaForge do not extend to counteracting a cell failure after it occurs.

Another area pertinent to this invention is technology which uses a common hardware platform for both charge control and providing regulated output power to an external load. This has also been referred to as bilateral conversion. Presently, these functions are generally achieved using separate circuitry performing similar functions. This results in a wasteful redundancy of circuitry, at the penalty of higher parts cost and space loss. A device which could combine charger and power supply functions therefore has obvious advantages. The merits of such a device was recognized by Burns et al. in U.S. Pat. No. 5,218,284 or "Integral Charging and Supply Regulation Circuit". Burns describes a circuit "for both selectively regulating the battery output and regulating the charging of a battery". The invention achieves the goal of a reduction in circuitry, but does not address the aforementioned problems associated with unbalanced cells within a series connected battery pack. The invention of Burns et al. also carries with it the traditional problems associated with switching regulators such as significant variations in efficiency when load requirements change.

Heretofore, an unfortunate requirement for all battery chargers which allow an alternating current input, (including those of LaForge and Burns et al.) is a prerectification stage. In addition to the losses introduced by the rectifier semiconductors, significant overall efficiency is lost because of the poor power factor commonly associated with this circuitry when combined with the non-linear load characteristics of a battery pack.

An opportunity in the area of battery pack control left largely unexplored which could reduce or eliminate the shortcomings in the above prior art is the utilization of pulse amplitude modulation (PAM) in a bi-directional power converter. Pulse amplitude modulation has been used in the past in inverters and motor variable speed drives to create a high efficiency, high quality sinewave output. PAM has also been used in the past to create high efficiency DC power supplies. The need for multiple voltage levels to create the necessary voltage steps used in PAM proved to be too cumbersome and expensive. PAM systems have largely been replaced by more simple pulse width modulation (PWM) converters to produce both AC and DC outputs. In a battery pack, however, multiple voltage sources are readily available by selecting series connected subgroups of varying size from the pack. A device which has the ability to select these subgroups end connect them to a common input/output power bus, at real time speeds, would provide significant advantages. In addition, a degree of synergism emerges from this approach which more than compensates for any additional complexity required in its implementation.

OBJECTS AND ADVANTAGES

It is the general object of this invention to provide a battery pack power distribution unit (PDU) which uses a common hardware platform to charge, discharge, bypass failed cells and perform battery management functions using individual cell control techniques as detailed below.

1. To provide a battery pack power distribution unit (PDU) which can, at real-time speeds, select a series connected subgroup from the pack. The subgroup may be of any length, and at any position in the pack. The subgroup poles are placed according to a selected polarity, in contact with a power bus. This ability provides the following advantages:

a) The instantaneous value of an AC or DC charging waveform is analyzed and routed directly to an appropriate section of the pack without prerectification. Thereby extending voltage range, improving power factor and increasing efficiency over prior art methods.

b) A high quality AC or DC output is generated using combined pulse amplitude modulation (PAM) and pulse width modulation (PWM) techniques. The modulation is accomplished by the connection of pack subgroups of varying size end for varying duration to the power bus at real-time speeds.

c) Service life is increased over conventional full-pack systems by managing the distribution of energy into or out of individual cells, thus preventing their overcharge or overdischarge.

d) Total energy capacity is increased since charge and discharge cutoff is no longer dependent on the weakest cell in the pack.

e) A bypass is initiated around an open or closed circuit cell failure, while still providing access to energy in the remaining functioning cells. The bypass is accomplished by sharing the load between a number of smaller, less costly switches.

2. To provide a PDU which performs battery management functions including internal diagnostics, warning of impending failure, fuel gauging and general record keeping.

3. To provide a PDU which during idle periods has the ability to pass cell energy from cells with higher charge to cells of lower charge thereby actively balancing the pack.

4. To provide a PDU which can place individual cells from the pack into a state of deep discharge to remove polarization or "memory" effects, or to test their condition. The procedure is an improvement over prior art methods in that cell energy can be removed through distribution to other cells in the pack rather than being dissipated through an introduced load. A deep discharge may also be made on individual cells by discharging the cells back into the charge source when it is available. The deep cycle groups are made small enough to allow the procedure to be transparent to pack operation, thereby always leaving the pack in a state of readiness.

5. To provide a PDU which can accommodate a larger variation in cell characteristics over conventional full-pack systems, thereby widening manufacturing constraints and easing the use of cell chemistries which heretofore were more difficult to match into a series pack.

DRAWING FIGURES

In the drawings, closely related figures have the same number but different alphabetic suffixes.

FIG. 6a depicts a sinewave being analyzed by the PDU.

FIG. 6b depicts how cell groups can be assembled to produce or charge from a sinewave.

FIG. 7 is a flowchart illustrating the charge algorithm.

FIG. 8 is a flowchart illustrating the combination pulse amplitude, pulse width modulation algorithm.

FIG. 9 is a flowchart depicting the sinewave discharge algorithm.

FIG. 10 is a flowchart depicting how sinewave waveform data is generated.

FIG. 11 is a flowchart illustrating the equalization algorithm.

FIG. 12 is a flowchart depicting the algorithm for analyzing pack statistics.

FIG. 13 depicts how weight factors are assigned to candidate groups.

Figure 14A:
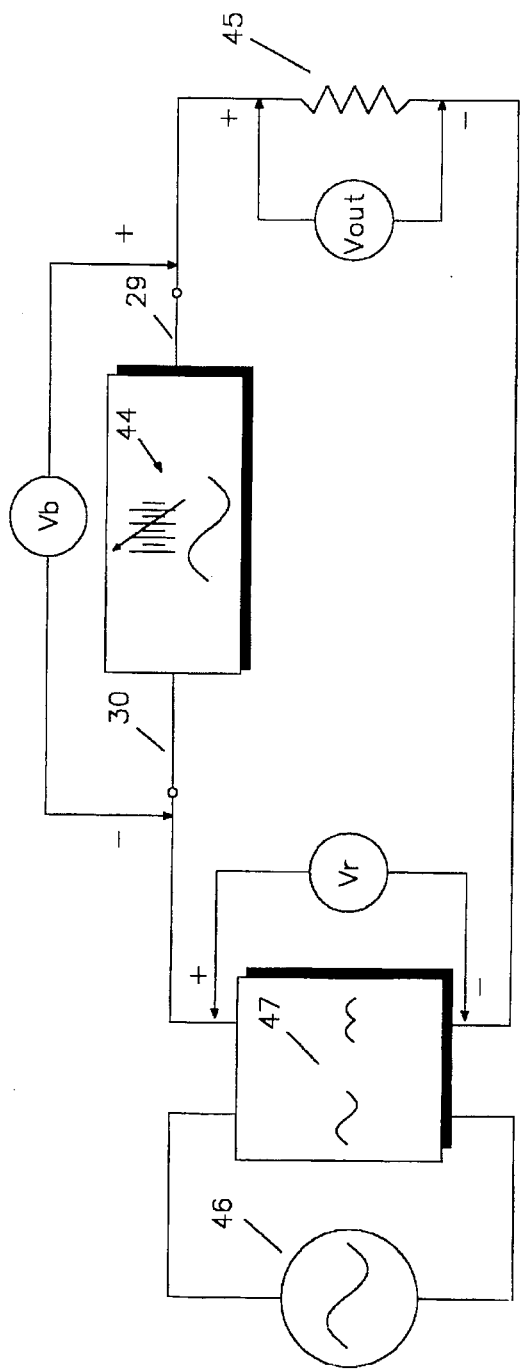
FIG. 14a depicts an application of the invention referred to as "active waveforming"
Figure 14B:
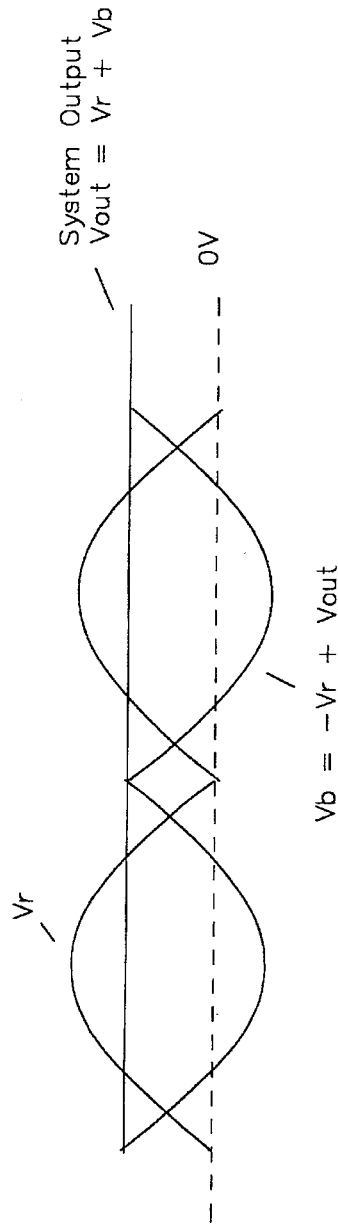

FIG. 14b further depicts "active waveforming"

Figure 15:
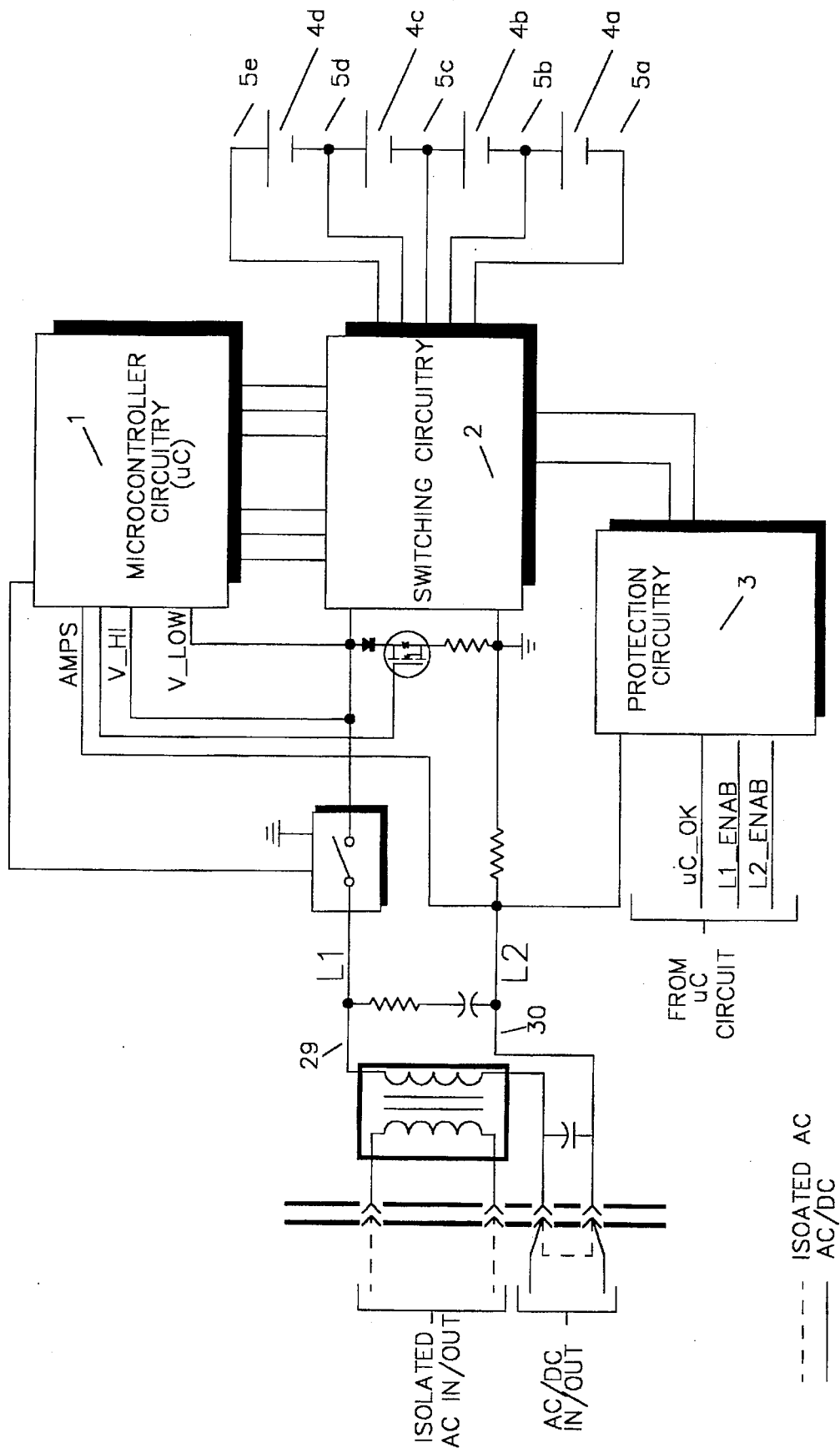

FIG. 15 is a simplified block diagram of the PDU.

DESCRIPTION—FIGS. 1–5

Figure 1:
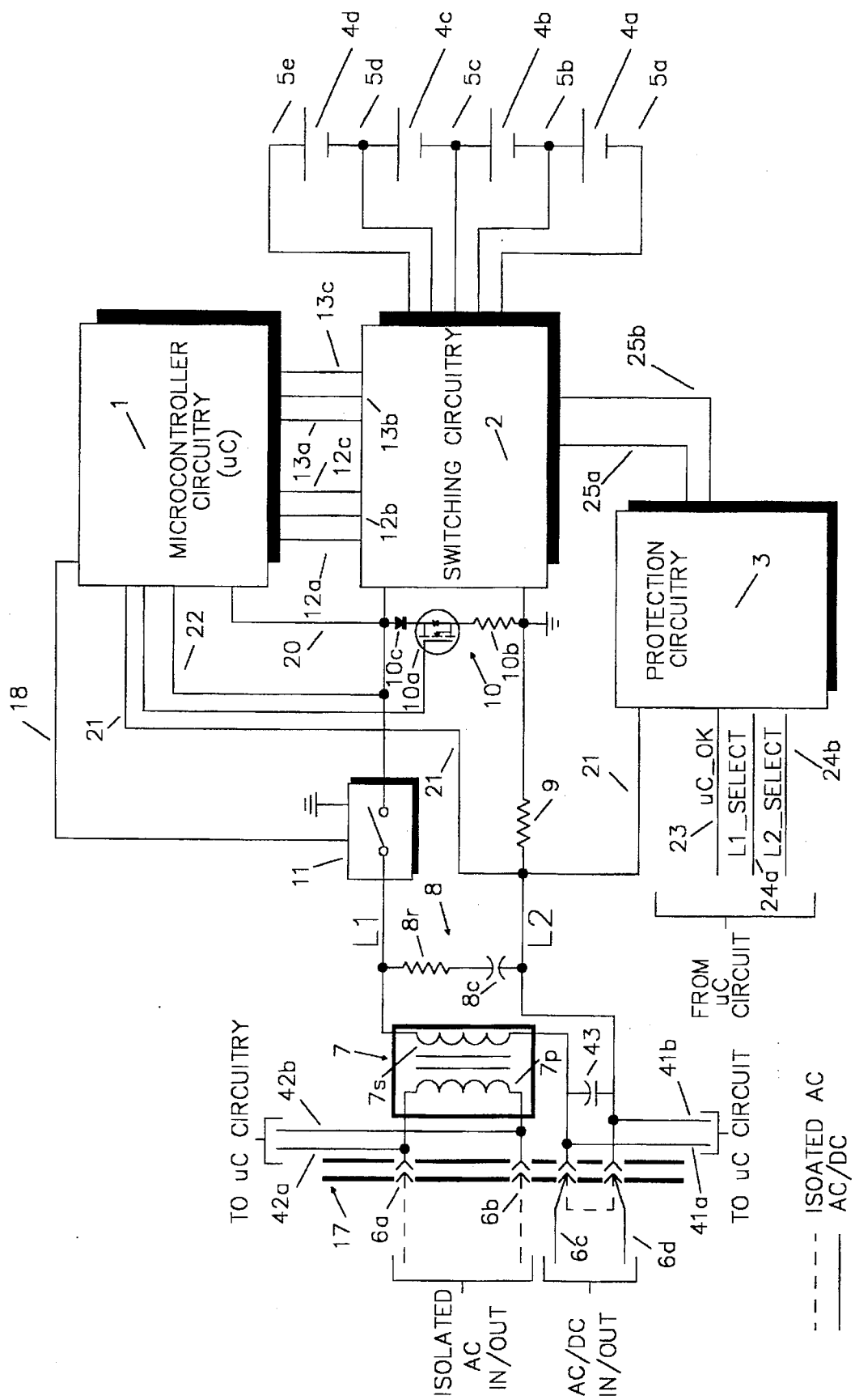
FIG. 1 is a block diagram of the PDU.

FIG. 1 is a simplified block diagram of the PDU of this invention. There are three main circuit groups; microcontroller circuitry 1, switching circuitry 2 and protection circuitry 3. A four cell series-connected battery pack is shown consisting of battery cells 4a,4b,4c,4d. Practical embodiments would typically have more cells then shown in this specification, the number has been limited to aid the reader in understanding the concept of the invention. The poles of every cell in the pack are accessed by switching circuitry 2 via tap points 5a,5b,5c,5d,5e. Charge and discharge energy passes through leads 6a,6b,6c,6d of mating connector 17. For electrically isolated AC charge or discharge, both the primary 7p and secondary 7s windings of transformer 7 are used while non-isolated AC or DC current passes only through secondary 7s. A resistor-capacitor (RC) circuit for suppressing switching transients is established with capacitor 8c and current limiting resistor 8x. The RC circuit also acts as a storage element during cell balancing as will be explained later. A main contactor 11 is energized from microcontroller digital output line 18. The main contactor isolates the pack from external devices to provide a safety barrier against accidental discharge or damage from abnormally high charge signals. The contactor is opened to allow a selected cell potential to be sensed by the microcontroller through analog input line 20. The measured cell is loaded down during measurement by turning on MOSFET 10a via digital output line 22. This allows cell current to flow through measurement load resistor 10b. Diode 10c prevents reverse current flow through MOSFET 10a. When the main contactor is closed, energy is allowed to enter and leave the pack freely. In this state, higher scaled voltage readings are brought into the microcontroller through analog input line 19. Electrical current readings are taken across shunt resistor 9 using current feedback line 21. Direct readings of the pack output are taken through differential analog input lines 41a,41b if the pack is configured for non-isolated AC or DC output. Differential analog input lines 42a,42b are used if the pack is configured for isolated AC output. Electrolytic capacitor 43 is used to aid in the filtering of a DC output from the pack when the pack is in this mode of operation. Current feedback line 21, microcontroller health status line 23 and multiplexer select lines 24a,2b are brought to protection circuitry 3 to determine if switching will be allowed. Switching circuitry 2 receives the multiplexer-on lines 25a, 25b from the protection circuitry and address lines 12a,12b, 12c,13a,13b,13c as commands to select the cell group specified by the internal program of microcontroller circuitry 1. In the preferred embodiment, a standard off-the-shelf microcontroller board utilizing the Siemens Corp. 80C196 processor was used. A large number of microcontrollers with similar capabilities are available in the industry and would also be suitable.

The circuitry of FIG. 1 is powered by an off-the-shelf DC—DC converter module connected across cells 4a through 4d. The converter has a wide input range to allow for variations in cell potential. Normally, the pack cells would not be allowed to drop below the DC—DC converter minimum input voltage, if due to some error this were to happen the DC—DC converter input would be fed by a backup external power supply.

Figure 3:
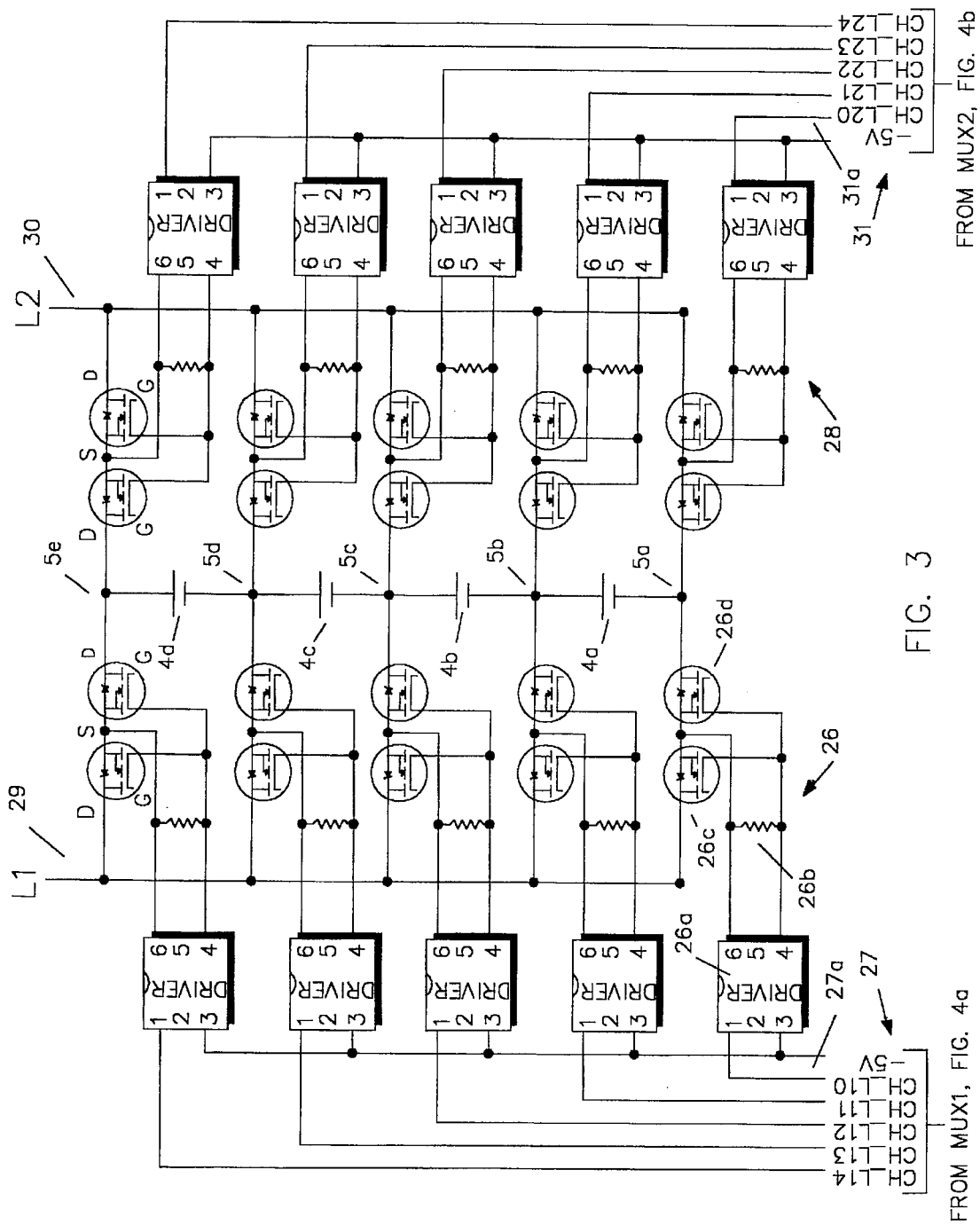
FIG. 3 is a detail of the cell switching arrangement using power MOSFETS.

FIG. 3 depicts the cell switching arrangement of the preferred embodiment of this invention. Switching is accomplished using a number of identical bi-directional switch circuits which allow current flow in either direction. The switches are controlled by switch select lines 27,31 from the multiplexer circuits of FIG. 4a and FIG. 4b. A typical bi-directional switch circuit 26 is comprised of isolated driver 26a, N-Channel MOSFETS 26c,26d and gate to source resistor 26b. Gate to source resistor 26b shunts charge buildup at the MOSFET gates which might otherwise cause false turn on. A logic high on switch select line 27a will cause driver 26a to turn on MOSFETS 26b,26d establishing continuity between tap point 5a and L1 power bus 29. When bi-directional circuitry 28 is enabled by a logic high on switch select line 31a continuity is made between tap point 5a and L2 power bus 30. The same configuration is used to make continuity between tap points 5b,5c,5d,5e and power buses 29,30. It is quite important that the switch drivers have an isolated output, since gate and source potential referenced to any point on the pack will vary as we move from cell to cell. In the preferred embodiment the driver outputs are generated photoelectrically and are completely isolated from the input. This gives the ability for identical switching circuits for any number of pack cells. The drivers were purchased from Component Technology Corp. under part number CT-201AD.

Figure 4A:
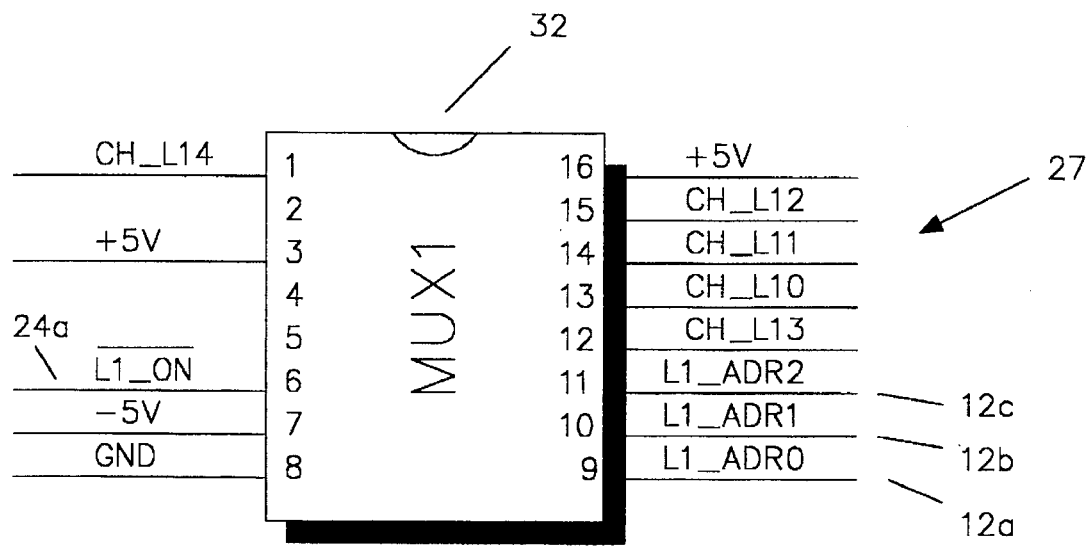
FIG. 4a and FIG. 4b are drawings of the multiplexer circuitry for selecting the cell switches.
Figure 4B:
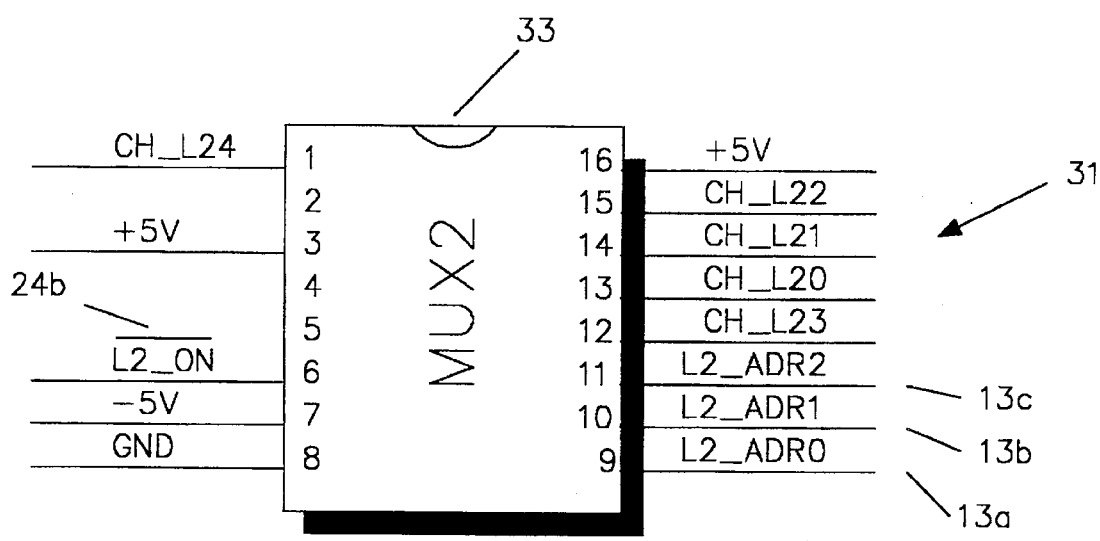

FIGS. 4a and 4b depict the multiplexer cicuitry which is a subset of switching circuitry 2. MUX1 enable line 24a enables multiplexer 32 to turn on any switch select line of group 27. A switch select line is chosen from multiplexer 32 according to binary address lines 12a,12b,12c. The operation of multiplexer 33 is the sane as 32. MUX2 enable line 24b enables multiplexer 33 to turn on any select line of select line group 31. A switch select line is chosen from multiplexer 33 according to binary address lines 13a,13b, 13c. Multiplexers 32 and 33 are off-the-shelf devices, in this case model CD4051B from Harris Corp. were used, although many others with similar specifications would be suitable.

Figure 5:
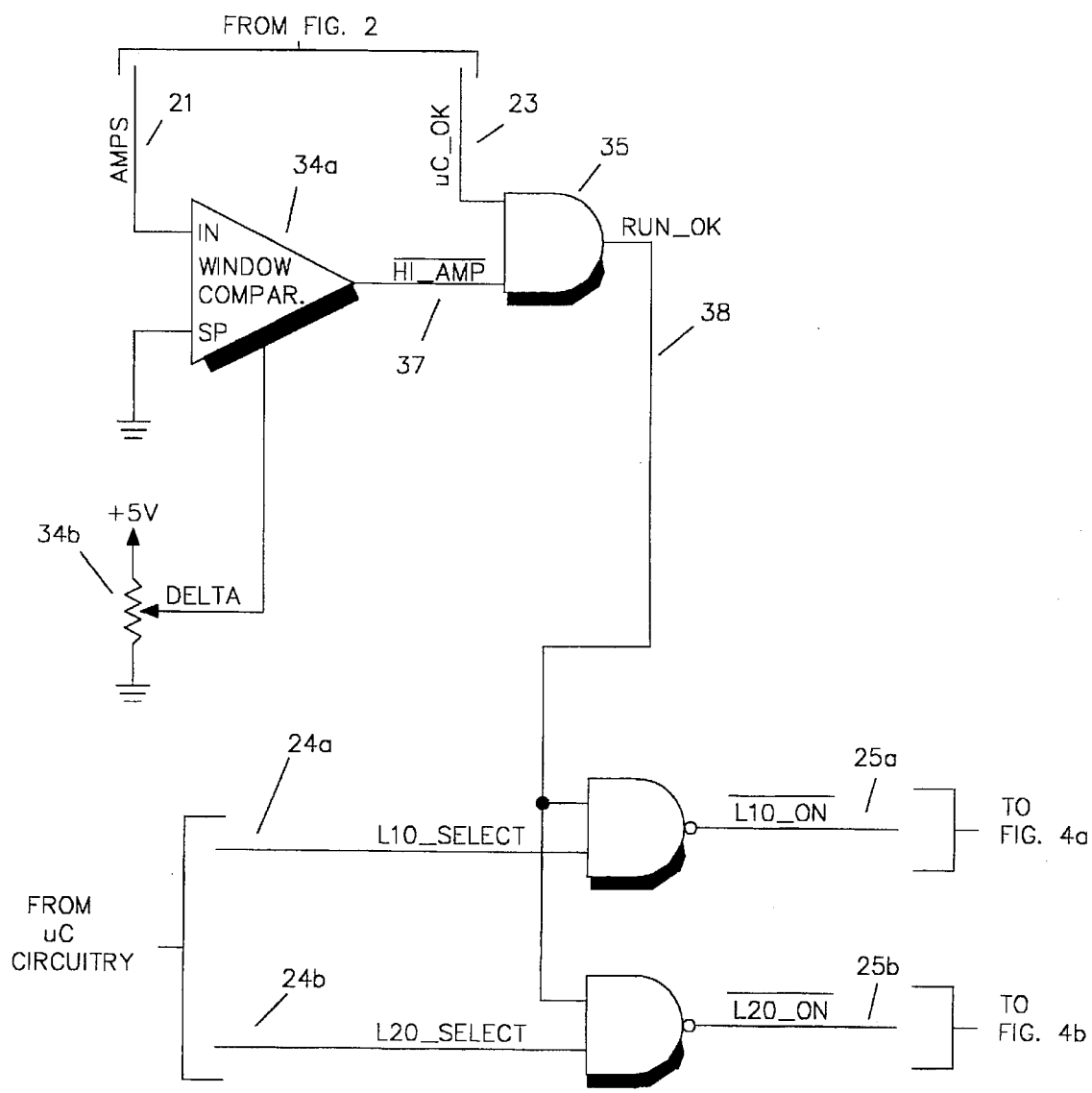
FIG. 5 is a drawing of the hardware protection circuitry.

FIG. 5 depicts the protection circuitry which prevents any connections to the L1 or L2 power bus when abnormal conditions exist. Out of limit current is detected by window comparator 34a and window size reference potentiometer 34b which adjusts the limits on the current feedback signal on line 21. If the signal is within limits a logic high is present on line 37. Line 37 is anded with microcontroller health status line 23 to produce run enable signal 38. Run enable signal 38 is brought to NAND gates 36a,36b. MUX1 select line 24a is NANDED with run enable line 38 to produce logic low MUX1 enable on line 25a. MUX2 select line 24b is NANDED with run enable line 38 to produce logic low MUX2 enable on line 25b.

The firmware present in microcontroller circuitry 1 determines the operation of the aforementioned hardware and will now be discussed as part of the operational description of the invention.

Operation—FIGS. 1 to 10

Figure 2A:
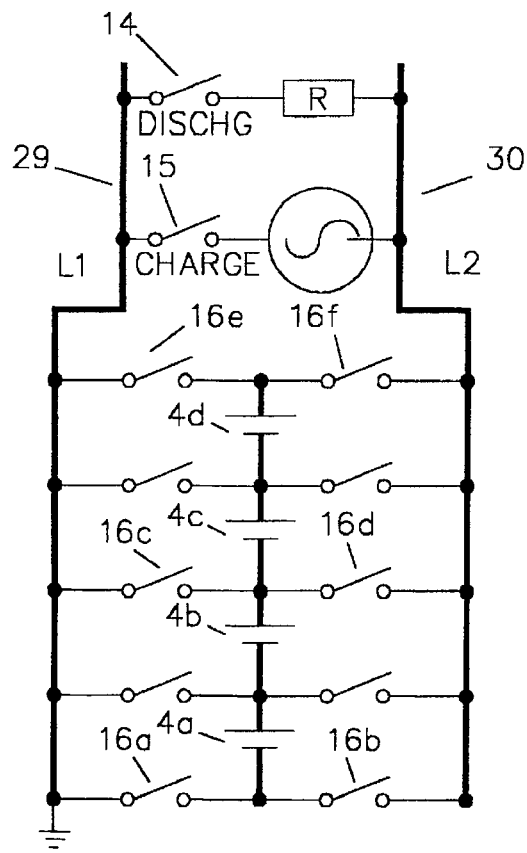
FIG. 2a is functional drawing of the PDU cell switching arrangement using mechanical switches for illustration.

FIG. 2a is the PDU switching arrangement reduced to simple mechanical switches in order to aid discussion. Referencing to L1 bus 29 as common, a positive bus voltage will mean that L2 minus L1 is positive and a negative voltage will mean that L2 minus L1 is negative. Using the switches of FIG. 2a a cell group of any size or polarity can be connected to the power bus. For example, to connect a two cell group to the bus at a positive potential, switches 16a and 16d would be closed with all other switches open. The voltage on the bus would now be the positive sum of cell voltages 4a and 4b. To reverse the polarity for the sane group, switches 16b and 16c would be closed with all other switches open. To construct a positive four cell group consisting of cells 4a,4b,4c,4d, switches 16a and 16f would be closed with all other switches open.

Another concept essential to the understanding of this invention is that cell groups can be selected from any position in the pack. The first example showed the connection of the two cell group; cells 4a,4b. It should now be noted that if a two cell group is desired, a selection of three possible combinations is available; cells 4a,4b or cells 4b,4c or cells 4c,4d. An alternative two cell group of cells 4c,4d could have been used in the first example by closing switches 16c,16f and leaving all other switches open. During operation only one group is selected at a time. The selection is made on a priority basis which will be discussed later in more detail. In practice, the mechanical switches of FIG. 2a could not be employed because the selection of pack subgroups is made very quickly or at real-time speeds. This is why the MOSFET switching circuit depicted in FIG. 3 is more suitable.

The microcontroller circuitry initiates a switch selection by turning on the multiplexer select lines 24a and 24b of FIG. 1. The multiplexer select lines are sent to the protection circuitry of FIG. 5. In FIG. 5 bipolar window comparator 34a determines if the electrical current through the L1,L2 bus as represented by feedback signal 21 is outside of the limits set by reference potentiometer 34b. If the current is within limits a logic high is presented and ANDED with microcontroller health status 23. Microcontroller health status is high if the controller has no hardware failures and the control program is running properly. The output of AND gate 35 is then NANDED with the multiplexer select lines 24a,24b. If conditions are normal a logic low will be sent on multiplexer-on lines 25a,25b to multiplexers 32 and 33 of FIG. 4. A logic low enables the output of these multiplexers. The switches are addressed using L1 address lines 12a,12b, 12c and L2 address lines 13a,13b,13 c as shown in FIG. 4. When given the address of a switch the multiplexers will send a logic high output to the respective bi-directional switch driver of FIG. 3. The driver which connects the negative pole of cell 4a is shown as item 26a on FIG. 3. The driver is part of bi-directional switch 26. Driver 26a will generate a drive voltage of 10 to 15 volts DC as a gate to source voltage for MOSFETS 26c and 26d. The MOSFETS 26c and 26d will then allow hi-directional current flow between the L1 power bus and the negative pole of cell 4a. The other bi-directional switches of FIG. 3 work in the same manner.

Selecting Groups

As mentioned earlier, a group is a selection of series connected cells within the battery pack. For a pack containing N series connected cells there are N possible group sizes that could be selected. For any group size there may be more than one string of cells which could be selected. In fact, for a pack size N and a group size G there are N−G+1 possible groups which meet the size requirement. For example, if a pack contains four cells numbered i through 4, and a group of two cells is to be selected, then cells 1 and 2 or cells 2 and 3 or cells 3 and 4 qualify as candidate groups. For a group to be an eligible candidate all cells in the group must be enabled for energy transfer. Cells may be disabled for a number of reasons which will be discussed in the following sections. The best candidate group is picked according to a weighing factor generated by the Eq. 1 below. The equation only contains the most vital factors necessary for group selection, more possible factors are detailed in the ramifications section of this application.

$$\text{Weight}=A*(\text{Accumulated Energy Deviation})+B*(\text{Terminal Voltage Deviation}) \quad \text{Eq. 1}$$

FIGS. 12,13 illustrate the algorithm for assigning weight factors to candidate groups. In FIG. 12 pack statistics are calculated; each enabled cell in the pack is sequentially accessed for its voltage value and the accumulated energy that has been transferred to it (in charge mode) or from it (in discharge mode). The cell voltages and transfer energy are accumulated in running sums until all enabled cells have been scanned. When all enabled cells have been scanned the running sums are divided by the total number of enabled cells to produce pack averages for cell voltage and energy transfer.

The energy transfer value for each cell accumulates during normal operation whenever any cell voltage varies beyond a predetermined tolerance. When all cell voltages are within the tolerance for a preset time period the accumulated energy value is reset. Without this reset, the accumulated energy aptly applied to bring the deviant cells back into balance would be seen as an imbalance in itself. The control of the pack would be thrown into oscillation trying to transfer extra energy to deviant cells and then trying to correct for the energy applied.

In FIG. 13 each possible candidate group is sent to the weighing subroutine. Each cell within the candidate group has its cell voltage subtracted from the pack average. The difference is accumulated in a running sum. Each cell within the group also has its accumulated energy transfer value subtracted from the pack average and the difference accumulated in a running sum. After all cells in the group have been scanned the running sums are divided by the total number of cells in the candidate group. The result is a candidate group voltage deviation number and energy transfer deviation number which are applied to Eq. 1 above.

If the cells within the candidate group have been charged while in charge mode or discharged while in discharge mode more than the average for the pack, then the accumulated energy deviation will be a positive value.

The weighing constants A,B adjust the effect that the individual elements will have on the equation result. In charge mode, the value of B will be negative in order to reduce the weight factor produced if the voltage deviation is positive. This is because a higher average terminal voltage for the group means that the group has an overall higher state of charge than the pack average, indicating that there are other groups of the same size which should be charged first. Conversely, for the discharge mode, factor B will be positive since groups with higher than average terminal voltage should produce a larger weighing factor in order to be discharged first to maintain balance in the pack.

For each possible group size, the candidate with the highest weighing factor is selected and stored in an array structure. Later when a specific group size is needed by the control program, this array, referred to as the priority group array, is ready to be accessed for the information needed to connect the requested group to the system power bus.

Failed Cell Bypass

As discussed above, whenever a cell disable flag has been set, the cell becomes ineligible for selection to the priority group array. Candidate groups will be chosen around the cell and no further attempt of energy transfer will be made. By selecting groups around the failed cell, much of the available energy can still be extracted from the battery pack. The pack can be made to tolerate higher incidences of cell failure by including more cells, so even with a cell failure, a group large enough to maintain the required pack output voltage can be selected. Since the system inherently balances the use of cells, packs with higher cell numbers can use smaller cells which will keep the total energy capacity of the pack constant. For example, a 10 KW battery pack with 20 10 KW cells can not tolerate a cell failure if all 20 cells in series are needed to maintain the pack output voltage. However another 10 KW battery pack could be constructed with 40 5 KW cells which could tolerate a worse case cell failure and still maintain a 20 cell series output voltage.

Disabling Cell Access

There are a number of conditions which will cause the control program to disable access to individual cells, they are described below:

End of Charge:

During charge mode the control program will periodically open all switches, open contactor 11 of FIG. 1 and begin placing individual cell terminals across the power bus. Loading circuit 10 is turned on to place a small electrical load on the cell. Each cell voltage is sampled using low voltage analog input line 20. After each pack voltage scan the previous scan is retained in a separate internal storage location. This is to allow the use of the currant and last measurement to determine rate of voltage change versus time. This value is retained in the cell array structure as a slope value. Depending on the cell chemistry, there are a number of techniques used to determine when a cell has completed charging. For Silver-Zinc type cells a simple maximum terminal voltage of 1.9 volts is used. When this value is reached, a logical disable flag is set for this cell in the cell array structure. Other chemistries may require the use of the above slope value, for example a negative slope value has been used in the industry to indicate end of charge for nickel-cadmium batteries.

End of Discharge:

During discharge individual cells are momentarily connected to the power bus and the bus voltage is sampled using high voltage analog input line 20. The connection time is made short enough so that the flywheel effect of transformer 7 holds up the pack output for the short time when the pack power bus is at a single cell potential. If the output is DC, then electrolytic capacitor 43 and transformer secondary 7S maintain the output. If the output is AC, then the cell is placed on the bus near the zero crossing point of the waveform thus causing minimal interference. Whenever a cell potential falls below a minimum level dependent upon its cell chemistry, the cell disable flag is set in the cell array structure.

Cell Failure:

If a cell measurement is made during charge or discharge that falls outside a reasonable level, the cell disable flag will be set along with a closed circuit failure flag. For silver-zinc cells these boundaries are set to greater than 1.0 volts if the cell is between 1% and 30% charged, and greater than 1.4 V if the cell is greater than 30% charged. Additionally, at periodic intervals, single cells are connected to the charge source and the current flow into the cell is measured. A rough impedance calculation is made by dividing the bus voltage by the cell current. If the impedance is above a preset limit then the cell is disabled and flagged as an open circuit failure. For silver-zinc cells this limit is set to five ohms. A cell failure is also initiated if an amount of energy greater than 150% of the rated cell capacity has been transferred to the cell during charge.

Operating Modes

The general operating modes for the system are charge, discharge, equalization, maintenance cycle and sleep. Charge mode inputs energy to the pack and properly distributes it to the most needy cells. Discharge mode drains the pack of its energy while maintaining a regulated output voltage and balance between the cells. Equalization occurs during times of idleness and is used to move energy from stronger cells to weaker cells so that the cells will reach minimum voltages at roughly the same time. Maintenance cycle mode deep cycles selected cells to remove any polarization effects. Sleep mode is entered after a preset period of idleness if the pack is already balanced an not in need of equalization. Sleep mode is a state where power consumption is reduced to a minimum. The operating modes are discussed in more detail below.

Charge Mode

The charging source may be brought in through transformer 7 of FIG. 1 if it is an AC waveform that needs to be stepped down and/or electrically isolated from the PDU. In this case pins 6a,6b of mating connector 17 would be used for the input. If the charge source is DC or AC and within range of the PDU capabilities then pins 6c and 6d of mating connector 17 would be used. The voltage range of the PDU varies with the rating of the MOSFET components chosen and the number of cells in the pack. In an embodiment of say forty cells, 400 volt MOSFETS and a 3:1 step-down transformer the acceptable voltage range through pins 6a,6b would be between 10–460 VAC to maintain charging. For most efficient operation the voltage range would be preferably between 105–240 VAC. The voltage range through pins 6c and 6d would be between 2–135 VAC to maintain operation and between 50 and 110 VAC for most efficient operation. A DC voltage between 3 and 200 VDC is acceptable through pins 6c,6d but more preferably between 50 and 120 VDC for most efficient operation.

Main contactor coil 11 of FIG. 1 is initially deenergized, isolating the PDU from the charge source. The charging waveform is analyzed by sampling high-range input line 19. If the charging waveform is within acceptable values the system will be allowed to begin a charge period. Before closing the main contactor a scan of all cell voltage in the pack is taken in the following manner: Each cell is sequentially addressed by the microcontroller to be connected to the L1–L2 power bus. A loaded voltage measurement is made by turning on MOSFET 10a via digital output 22. This allows cell current to flow through measuring load resistor 10b. Each cell voltage is read via low-range analog input 20.

The contactor is now closed and the charging waveform is present on the L2–L1 power bus. Refer to FIG. 7 for a flow chart representation of the following algorithm while also referring to FIGS. 6a,6b as a graphical aid for understanding how the PDU interacts with a charge waveform. FIG. 6a shows a sinewave charging waveform. The amplitude of the waveform is measured from the L2 bus in reference to the L1 bus and is assumed to be in the operational range of the PDU.

Referring to FIG. 6a, a sample, 40a of the charge waveform is made by the microcontroller circuitry. A small delay 40b is set up, preferably between 10–100 microseconds before a second sample 40c is taken. The difference between the two samples divided by the delay period is used to determine the slope of the waveform. Multiplying the slope value times a preset time for how long the cell switches will be turned on 40d and adding this to second voltage sample 40c produces a predicted value of charge voltage 40e. A logical polarity flag is set to a true state if the predicted voltage is positive or zero. The polarity flag is set to false otherwise. A logical relation flag is set to a true state if predicted voltage 40e is greater or equal to second sample 40c, or set to false otherwise. An exclusive OR function is performed on the slope and polarity flags setting a rise flag if the function produces a true result. A true value for the rise flag indicates that the absolute value of the charging waveform is rising or constant, this is the general area indicated by reference numerals 39a and 39c of FIG. 6a. A constant waveform would be produced by a DC charge input or perhaps the generally flat top and bottom portions of the AC waveform. If the rise flag is false then the absolute value of the charging waveform is falling as indicated by the general area around reference numerals 39b and 39d of FIG. 6a.

If the rise flag is true, second sample value 40c is divided using integer division by a nominal cell voltage value. The result is an integer number representing the largest group size with a series voltage that does not exceed second voltage sample 40b. If the rise flag is false a different method must be used to select the group size. Selecting the same group size as before would allow the charge waveform to drop below the series voltage of the group and the group would discharge through the bus rather than charge. For this reason the predicted voltage calculated earlier rather than second sample 40c is divided by the nominal cell voltage to produce an integer group size. FIG. 6b shows a rough representation of how group sizes are chosen to follow the sinewave of FIG. 6a. The information needed to turn on the group is retrieved from the priority group array discussed in the previous section. The group is then turned on until the current flow exceeds a preset maximum or the turn on time exceeds a preset value. The maximum current limit is used as a method to control the rate of charge. The energy applied to the selected group is recorded while charging, and this information is periodically distributed to individual storage locations for each cell within the group. The individual cell information is used in the group weighing equation also described earlier, as well as for general monitoring functions.

In certain instances, a group size and polarity is chosen to purposely cause a high energy discharge from the pack into the charge source. This is commonly referred to as reverse pulsing, and is done to depolarize the pack cells and reduce internal resistance build-up. Such a practice is a now common method used in the industry to achieve rapid charging. Hence the PDU of this invention differs from prior art in that it analyzes and adapts to the incoming charge source rather than requiring the source to be within more closely defined boundaries. This ability allows less stringent input requirements and eliminates the losses associated with rectification and filtering.

Discharge Mode

Three forms of discharge can be initiated in the preferred embodiment; Stepped DC discharge, DC modulated discharge and AC discharge. The form of discharge is determined according to application. AC discharge would more likely be used when voltage translation or isolation is required. DC discharge would be used in systems which use a common DC power bus throughout, as in a portable computer or communication system. DC modulated discharge meets more stringent voltage regulation requirements but introduces switching noise to the system. DC stepped discharge introduces less noise but requires more battery cells for proper balancing. It also only regulates to within the voltage value of one cell.

DC Stepped Discharge.

This form of regulated discharge is the simplest. Referring to FIG. 1, in this mode of operation, primary 7p of transformer 7 is disconnected and the solid line connections to pins 6c,6d are used as the output lines. A requirement for this function is that the pack is constructed to have enough battery cells to produce a series voltage greater than the output voltage setpoint even as the cell terminal voltages drop during discharge.

Initially a reference value is set equal to the desired pack output voltage. The first group size which exceeds the reference value is selected from the priority group array and connected to the power bus. The output from the pack is sampled using analog input lines 41a,41b and compared to the pack output voltage setpoint. If the output is below the setpoint then the reference value is increased, if the output is above the setpoint then the reference value is decreased. The group selection and reference voltage adjustment is repeated until the pack is fully discharged or not needed.

In the stepped discharge mode, the group size selected to create the requested output should be considerably less than the total pack size. If the group size is too large the system will be unable to correct imbalances to single cells due to overlap. Overlap occurs when one or more of the cells contained in one candidate group also appear in another candidate group. As an example, if a pack contains three cells numbered 1,2,3 and a group of two cells is needed, the only possible candidates are 1,2 and 2,3. Note that cell number 2 appears in both candidates. As the pack is discharged cell number 2 will be discharged disproportionately. For this reason the pack should have many more cells than the group sizes which are to be selected. If possible the pack should be large enough to allow selection of group sizes which are common denominators of the total number of cells in the pack. For a pack size of 12, group sizes of 1,2,3,4,6,12 are common denominators. The smaller sizes such as 1,2,3,4 allow the most effective cell balancing since there are more choices of candidate groups for each groups size.

DC Modulated Discharge:

This form produces a regulated DC output from the pack by employing a combination of pulse width modulation (PAM) and pulse amplitude modulation (PWM) techniques. FIG. 8 is a flow chart illustrating the function algorithm. Also referring to FIG. 1, in this mode of operation as in the DC stepped discharge mode, primary 7p of transformer 7 is disconnected and the solid line connections to pins 6c,6d are used as the output lines. Again a requirement for this function is that the pack is constructed to have enough battery cells to produce a series voltage greater than the output voltage setpoint even as the cell terminal voltages drop during discharge.

Initially an internal reference value is set equal to the desired DC output voltage of the pack. Each group in the priority group array is analyzed. Out of the groups which have series voltages that exceed the reference value the one with the highest discharge weight factor is selected from the priority group array. If the weight factors are equal, the group closest but greater than the reference value is selected. This first selected group will be referred to as the high group.

Out of the groups which have series voltages less than the reference value, the group with the highest weight factor is selected from the priority group array. If the weight factors are equal, the group closest but less than the reference value is selected. This group will be referred to as the low group.

The difference between the reference value and the low group voltage is divided by the difference between the high group voltage and the low group voltage to produce a modulation factor. The factor sets the fraction of a preset modulation period for which the high group will be connected to the power bus for. The low group will be connected for the remainder of the modulation period. For example, if the reference value falls exactly half way between the high group voltage and the low group voltage the modulation factor will be 0.5 and the high group will be turned on for 50% of the modulation period. The low group will be turned on for the remaining 50% of the modulation period. While the groups are on, the energy transfer out of the group is recorded and periodically distributed to the individual cells within the group. The individual cell information is used in the group weighing equation described in the group selection section, as well as for general monitoring functions.

When this modulated output reacts with the filtering effects of RC circuit 8 and transformer secondary 7s, the output at terminals 6c and 6d is a rippled DC voltage. The DC output is sampled by analog input lines 41a and 41b and compared to the desired pack output setpoint. If the actual output does not equal the output setpoint then the reference value is increased or decreased to compensate. The group selections are then updated and the function continues in a loop until externally requested to stop.

AC Discharge:

FIGS. 9,10 illustrate the algorithm used for AC discharge. Referring to FIG. 1 if the AC output is to be stepped up or down in voltage, or is required to be electrically isolated from the pack, pins 6a,6b will be used. Pins 6c,6d would be jumpered as indicated by the dotted line. Otherwise the output would be taken from terminals 6c,6d with the solid line connections. As with the DC discharge, a requirement for this function is that the pack is constructed to have enough battery cells to produce a series voltage greater than the desired output setpoint even as the cell terminal voltages drop during discharge.

An internal reference value is initially set equal to the desired AC peak output voltage of the pack. Using a preset frequency setting and the reference value a theoretical sinewave is calculated. Referring to FIG. 10, one half wavelength of the sinewave is separated into an array of equal time slices. The first cell groups size which exceeds the amplitude of the theoretical sinewave for each time slice is selected from the priority group array. Consecutive time slices which have groups which are close enough in size to be within a predetermined tolerance are consolidated into one time slice of longer duration.

Each time slice group size, duration and polarity is stored in a waveform array structure. Before completion, the array structure is compared to a substitution table for replacement of selected group sizes with group sizes that are nearly equal but more suitable for a balanced discharge. In general, these groups are common denominators of the largest available group in the pack.

The completed waveform array is accessed in a loop from beginning to end continuously for information to connect the sinewave groups to the output power bus. To produce a full period sinewave from the array which contains only one half period of information, the polarity of the groups are inverted on each pass through the waveform array, thus producing the bottom half of the sinewave. The resulting output waveform is a "staircase" sinewave which is smoothed by the reactance of RC circuit 8 and transformer 7.

The output voltage is monitored using analog input lines 42a,42b or 41a,41b and compared to the desired peak voltage setpoint. The reference value is then increased or decreased, the waveform array recalculated, and the process is repeated to produce an output that closely matches the setpoint.

Equalization Mode

FIG. 11 illustrates the algorithm used for this function. Typically contactor 11 of FIG. 1 would be open, isolating the pack from the load device.

All candidate groups are prioritized for discharge. The discharge group size which has the highest weight factor and is larger then a predetermined minimum size is selected. All candidate groups are then prioritized for charge. A charge group is selected which has the highest weight factor and is less than the discharge group by a predetermined margin. The discharge group is momentarily connected to the power bus for a time period sufficient to charge RC circuit 8 of FIG. 1. The discharge group is then disconnected and the charge group is immediately connected to the power bus. Electrical energy stored in RC circuit 8 will then flow from the capacitor to the charge group. The selection and redistribution function is repeated until all cells have terminal voltage deviations below a preset minimum or the pack is called back into normal operation.

Maintenance Cycle Mode

The maintenance cycle mode is the only mode of operation where cells of the pack are purposely put into a state of imbalance with the rest of the pack by being deep cycled. Deep cycling is helpful for relieving the so called "memory effect" commonly associated with NiCd and other battery chemistries. It has been shown in the industry that periodic deep discharge of cells can prevent and remove the memory effect.

Using its monitoring capabilities, the pack microcontroller determines that the pack has not being fully discharged for several cycles. A small group is selected from the pack on a rotating basis for deep discharge. In order to prevent appreciable effects on the pack energy capacity, this function can only be performed on packs which have preferably twice as many cells as are necessary to produce the desired pack output voltage. Also the size of the deep cycle group should be preferably half or less than the size of the group size necessary to produce the required output voltage. When it has been determined that deep discharge is necessary, the deep discharge group weighing factor is forced to a high level for discharge. The high weighing factor will cause a disproportionately large amount of energy to be extracted from the group during discharge. If enough energy is removed from the pack, the deep discharge group will be the first to reach end of discharge. Since the state was initiated because the pack had a history of not being fully discharged, however, it is likely that the deep discharge group will not be fully depleted at this time. If after this shallow discharge there is a period of idleness, another procedure is employed to increase the likelihood of the selected cells reaching end of charge. This procedure has the capability to deep discharge cells in the pack automatically during idle periods. Energy removed from the deep discharge group during this is not lost, but is redistributed to the remaining cells in the pack.

When the pack is idle, preferably for more than one hour, and the pack is preferably at least 10% discharged the mode is initiated. The deep cycle group is momentarily connected to the power bus for a time period sufficient to charge RC circuit 8 of FIG. 1. The group is then disconnected and the highest weighted charge group with a group size at least on cell below the size of deep cycle group is immediately connected to the power bus. Electrical energy stored in RC circuit 8 will then flow from the capacitor to the charge group. The procedure continues until the selected deep cycle group is completely discharged or the pack is needed again.

If the pack is recharged before either of the above deep discharge procedures is successful, energy will be fully restored to all cells including those selected for deep discharge. An attempt will be made again during the next discharge period.

Summary, Ramifications and Scope

Accordingly the reader will see that the power distribution unit of this invention can be used to efficiently charge a multicell battery, or provide a useable output of varying forms to an external load device. This invention performs these functions using a common hardware platform; thereby reducing the redundant circuitry associated with the use of independent chargers and power supplies. During charge or discharge the PDU maintains balance over individual cells to prevent damage from inherent differences in cell capacity. By accessing series connected groups of varying size, combination pulse amplitude and pulse width modulation is used to regulate the pack output voltage during discharge and to improve power factor during charging.

Although the descriptions above contain many specifications, these should not be construed as limiting the scope of the invention but merely as examples of preferred embodiments.

For example, the PDU this invention has been intentionally made flexible enough to accommodate varying pack sizes and cell chemistry. For smaller applications, such as portable electronics, laptop computers etc. the drivers and multiplexers of switching circuitry 2 could be removed to allow microcontroller output lines to directly control the MOSFETS. Such an arrangement would be suitable for packs of two to eight cells.

In many applications involving power semiconductors, the semiconductor heatsink requires significant volume to dissipate the losses due to switching inefficiencies. The internal plates and electrolyte of a battery cell or cells would serve as an excellent heatsink if means were employed to make a thermally conductive connection between the power semiconductor body and the battery plates. Some modification to the battery casing may also be required to dissipate this extra heat. This combined cell and semiconductor arrangement would have the potential of significantly reducing the space requirements of the PDU.

Throughout this disclosure the smallest controllable unit of the pack was made to be a single cell to aid in discussion. It is feasible that several matched cells could be put together in a set, and this set would be the smallest controllable unit. This arrangement would reduce the amount of control over individual cells, but it would also significantly reduce the amount of switching circuitry required.

Since the PDU controls each cell or set of cells independently it would be acceptable to include multiple cell chemistries in the same pack or perhaps a number of high density capacitors or "supercapacitors". In the later case, the supercapacitor section of the pack could be used for high rate charging and discharging to save wear and tear on the battery cells in the pack. A typical application would be in an electric vehicle power system where there is a high current demand during starts, and a short, high current charge burst during regenerative braking. During times of idleness the equalization mode of the PDU could be used to transfer cell energy to the supercapacitors, when a quick burst of energy is needed the energy could be extracted from the supercapacitors first.

If electrical isolation or transformation is not required for an application, transformer 7 could be replaced by an inductor which has considerably less size and weight.

In the group selection section above, a simple equation involving energy transfer and cell terminal voltage was used to prioritize cell groups. This equation could be extended to consider cell temperature, cell pressure, the theoretical temperature of the electronic switches or other pertinent data. Another powerful method for group selection is to maintain a history of cells or cell set characteristics over a number of charge and discharge cycles and use this historical data to aid in group selection.

In the preferred embodiment the same electronic switches that are used for power switching are also used for measuring cell terminal voltage. There may be applications where tight tolerances on output voltage regulation would necessitate the use of a separate method for measuring cell or cell set terminal voltage. The use of non-linear channel switching devices such as IGBTs or SCRS rather than MOSFETS would also necessitate the use of a separate method for measuring cell or cell set terminal voltage.

Figure 2B:
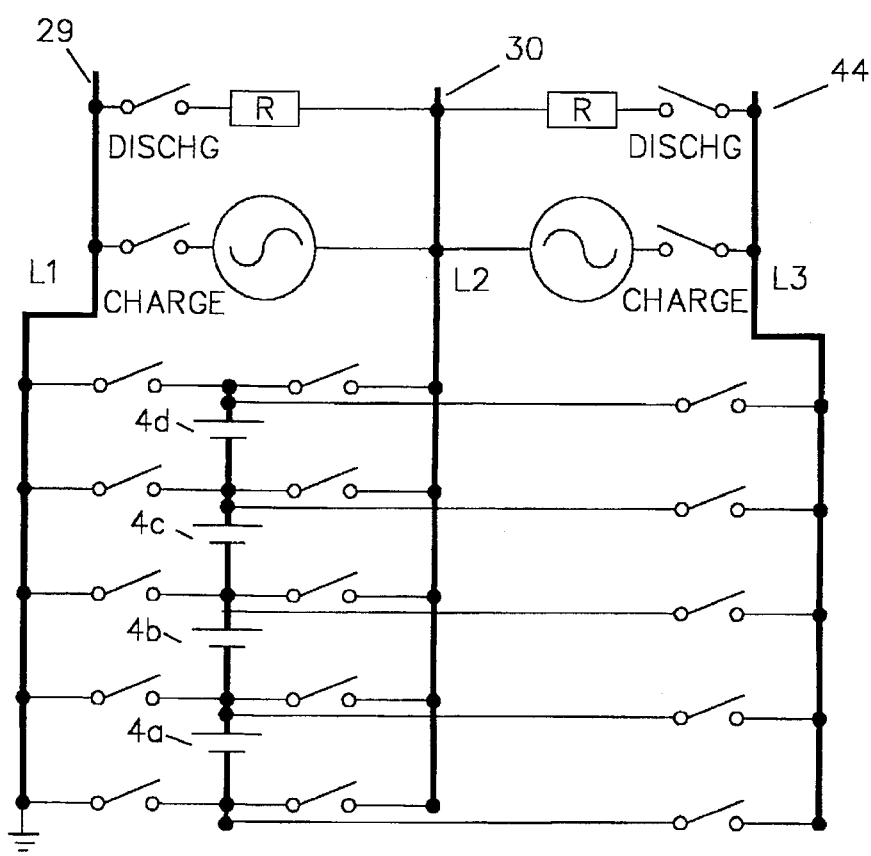
FIG. 2b is the switching arrangement extended to a three-phase ramification.

FIG. 2b depicts how the single phase switching arrangement of FIG. 2a could be extended to a three phase system for higher power applications, the operation of the three phase system would be similar to controlling the operation of two single phase systems at once.

For a system of reduced complexity and performance the bi-directional switches of FIG. 3 could be replaced with switches which allow current flow in only one direction. Referring to FIG. 3, bi-directional switch 26 would be replaced by a switch which would allow current flow only from L1 bus 29 to tap point 5a, and bi-directional switch 28 would be replaced by a switch which would only allow current flow from tap point 5a to L2 power bus 30. Single directional switches could be constructed using pairs of a single MOSFET and a single diode, or each set of two MOSFETS in the bi-directional switch could be replaced by a single insulated gate bipolar transistor (IGBT). The control program would be configured to charge only when L1–L2 is positive and provide a DC output where L2–L1 is positive.

An interesting application of the PDU is what will be referred to as "active wave forming". Referring to FIG. 13a, the PDU 43 is placed in series with a rectified voltage source 47 and load 45. The rectified source is derived from alternating voltage source 46. A desired voltage waveform (Vout), across load 45 is obtained by combining the algebraic sum of the rectified voltage source (Vr) and the PDU voltage output (Vb), or Vout=Vr+Vb. To obtain a DC output voltage, for example, the PDU could be programmed to produce Vb=−Vr+Vout making the output Vout=Vr+(−Vr+Vout)=Vout. The combination of the Vr and Vb waveforms is illustrated in FIG. 13b. Such a system would make an excellent back-up power system since when Vr is active, the PDU would act as a "float" system storing energy when Vb is negative and releasing energy when Vb is positive thereby remaining fully charged. If Vr was to decrease in amplitude or cease entirely, the PDU would fill in the missing portions to maintain Vout at the same level. The system would have excellent power factor and would only require enough energy from the cells to replace what could not be provided by Vr. There are many instances of "brown-out" where a utility company could still support a load at reduced voltages. This situation would be capitalized on by this application of the PDU.

Thus the scope of this invention should be determined by the appended claims and their legal equivalents, rather than by the examples given.

I claim:

1. In a multicell battery pack comprising a plurality of series connected cells, a power distribution unit for providing regulated, bi-directional transfer of energy to and from said pack or a selected portion of the pack comprising:

(a) a plurality of electrical tap points located at the end poles of the pack and at the junction between sets of one or more series connected cells within said pack, whereby any two consecutive tap points present the positive and negative poles of the cell set in-between, and where any two non-consecutive tap points present the positive and negative pole of a larger group produced by the series connection of all the cell sets between said non-consecutive tap points;

(b) at least two bus conductors for the transfer of energy into or out of any selected group of cell sets within said pack;

(c) individually controlled switching means for allowing current flow in at least one direction from any tap point to at least one bus conductor and individually controlled switching means for allowing current flow in at least one direction from the same tap point to at least one other bus conductor;

(d) controller means for executing pack control algorithm means for selecting the most suitable group of cell sets for regulating a preset output voltage to an external load and the most suitable group of cell sets for regulating the receipt of energy from an external source, and where said controller means includes the functionality of accessing and actuating said individually controlled switching means, and the input and output of analog and digital signals related to the control of said power distribution unit;

(e) sensing means for measuring a value indicative of the electrical current flow into or out of each cell set contained in said pack and supplying the measurement to said controller;

(f) sensing means with at least enough sensor connection points to measure a value indicative of the voltage across the poles of each cell set within said pack and at most enough sensor connection points to measure a value indicative of the voltage across the poles of each individual cell within said pack, and supplying the measurement to said controller;

(g) sensing means for measuring a value indicative of the voltage across the output terminals of said power distribution unit and supplying the measurement to said controller.

2. The power distribution unit of claim 1 where said controller means manages the internal transfer of energy from a first selected group of cell sets to a second selected group of cell sets by:

(a) accessing said switching means to connect the negative pole of the first group to one of the bus conductors and to connect the positive pole of said first group to one other bus conductor, whereby an intermediate energy storage device means which resides across the two bus conductors charges, at least in part, to the terminal voltage of said first group;

(b) disconnecting said first group from said two bus conductors;

(c) connecting the second group, which has been selected by said pack control algorithm means to have a terminal voltage less than the voltage across said storage device, to said two bus conductors, whereby electrical current flows from said storage device into said second group.

3. The power distribution unit of claim 1 where said controller means regulates a preset output voltage to an external load by employing a selection algorithm means to continuously select groups of cell sets of varying size and polarity and connect said groups of cell sets to said at least two bus conductors using said switching means, whereby a waveform is produced which approximates a sinewave of predetermined amplitude and frequency across said at least two bus conductors.

4. The power distribution unit of claim 1 where said controller means regulates a preset output voltage to an external load by:

(a) employing a selection algorithm means which selects a first group of cell sets that has a terminal voltage greater than the preset output voltage;

(b) employing a selection algorithm means which selects a second group of cell sets that has a terminal voltage less than said preset output voltage where said second group may also be a null group with a terminal voltage of approximately zero;

(c) accessing said switching means to successively connect said first group and said second group across said at least two bus conductors with a connection time ratio between said first group and said second group suitable to produce an average voltage output fore said power distribution unit which closely approximates said preset output voltage.

5. The power distribution unit of claim 1 where said controller means regulates the receipt of energy from an external source by:

(a) using the power distribution unit output terminal voltage sensing means to sample at least twice for a single preset charge pulse period, the voltage across the distribution unit output terminals;

(b) analyzing the voltage samples using mathematical means to produce a rate of change of the absolute value of the output terminal voltage and a predicted value of said output terminal voltage as it will exist after said preset charge pulse period has expired;

(c) if the absolute value of said output terminal voltage is increasing, accessing said switching means to connect a group of cell sets which have a series voltage less than or equal to the last sample taken of said output terminal voltage whereby electrical current will flow through said bus conductors to charge said group of cell sets;

(d) if the absolute value of said output terminal voltage is decreasing, accessing said switching means to connect a group of cell sets with a series voltage less than or equal to said predicted value of said output terminal voltage whereby for the duration of said charge pulse period electrical current will remain flowing through said bus conductors to charge said group of cell sets.

6. The power distribution unit of claim 1 where said pack control algorithm means for selecting the most suitable group of cell sets for regulating a desired output voltage to an external load and the most suitable group of cell sets for regulating the receipt of energy from an external source uses the operating temperature of said individually controlled switching means as a factor in selecting said most suitable group of cell sets.

7. The power distribution unit of claim 1 where said pack control algorithm means for selecting the most suitable group of cell sets for regulating a preset output voltage to an external load and the most suitable group of cell sets for regulating the receipt of energy from an external source includes factors that optimize the following: energy transfer efficiency, balance of state of charge between said cell sets and maintaining the reliability of said power distribution unit.

8. The power distribution unit of claim 1 where a plurality of said series connected cells have been replaced by high density capacitors.

9. An application of the power distribution unit of claim 1 where a series connection means is used to configure an external energy source and said power distribution in series, whereby a voltage is produced across an external load which represents the algebraic summation of the output voltages of said external energy source and said power distribution unit, and where the power distribution unit controller means employs a selection algorithm means which selects groups of cell sets to control said algebraic summation to approximate a preset output voltage across said external load.

10. In a power distribution unit comprised of a series connected multicell battery pack, a controller means for executing internal control algorithm means and an electronic switching network means for establishing a path for bi-directional energy distribution between an external device and said pack or selected portions of said pack, a method for managing said bi-directional energy distribution comprising the steps of:

(a) dividing said pack into fixed sets of one or more series connected cells, where said cell sets may be accessed individually to add or remove energy, or accessed in contiguous groups ranging in size from a null cell set to a size equal to the total number of cell sets in said pack;

(b) selecting one combination of contiguous cell sets, hereafter referred to as a charge priority group, for at least one possible group size, which is most suitable to receive additional energy based upon charge group priority factors which include the optimization of the following: balance of state of charge between said cell sets, charging speed, pack capacity, charging efficiency, cell life and said power distribution unit reliability;

(c) storing in said controller's memory the charge priority group information necessary to actuate said electronic switching network means to establish an energy path between an external energy source and said charge priority group;

(d) continuously measuring the voltage level of said external energy source during periods where said power distribution unit is charging said pack, and selecting a group size which is most suited to be connected to an external energy source based upon charge group size factors which include the optimization of: balance of state of charge between said cell sets, charging efficiency, cell life, said power distribution unit reliability;

(e) retrieving said charge priority group information from said controller memory and using the information to actuate said electronic switching network means whereby regulated energy flows from said external energy source to said charge priority group;

(f) selecting one combination of contiguous cell sets, hereafter referred to as a discharge priority group, for at least one possible group size, which is most suitable to discharge energy based upon discharge group priority factors which include the optimization of the following: balance of state of charge between said cell sets, pack energy capacity, discharge efficiency, cell life and said power distribution unit reliability;

(g) storing in said controller's memory the discharge priority group information necessary to actuate said electronic switching network means to establish an energy path between an external load and said discharge priority group;

(h) continuously monitoring said external load requirements during discharge, and selecting a group size which is most suited to provide regulated energy to said external load based upon discharge group size factors which include the optimization of the following: balance of state of charge between said cell sets, discharge efficiency, said distribution unit reliability;

(I) retrieving said discharge priority group information from said controller memory and using the information to actuate said electronic switching means whereby regulated energy flows from said discharge priority group to said external load;

(j) continuously monitoring the state of charge of cells within each cell set and disabling any cell set which contains cells outside preset state of charge limits from being selected as a component in any priority group;

(k) reducing the maximum possible priority group size as cell sets become disabled.

11. The method of claim 10 where group sizes are selected to maintain a distribution unit output voltage to an external load which approximates a sinewave.

12. The method of claim 10 where said discharge group size factors include selecting group sizes which are common denominators of said maximum possible priority group size in order to reduce usage overlap between groups of cell sets, thus improving energy distribution balance between said group of cell sets.

13. The method of claim 10 where group sizes are selected to maintain a preset power distribution unit output voltage by steps comprising:

(a) assigning a discharge group weighting value to each said discharge priority group using mathematical weighting means based upon said discharge group priority factors;

(a) selecting a first discharge priority group which satisfies the requirements of both having the highest said discharge group weighting value and having a group terminal voltage which is closest without exceeding the preset output voltage;

(a) selecting a second discharge priority group which satisfies the requirements of both having the highest said discharge weighting value and having a group terminal voltage which is closest without being less than said preset output voltage;

(c) actuating said electronic switching means to successively connect said first group and said second group to said external load with a connection time ratio between said first group and said second group suitable to produce an average voltage which approximates said desired output voltage.

14. The method of claim 10 where said charge group priority factors and said discharge group priority factors include using historical information of past charge and discharge cycles of said cell sets.

15. The power distribution unit of claim 10 where said controller means regulates the receipt of energy from an external source by steps comprising:

(a) sampling at least twice for a single preset charge pulse period, the voltage of said external energy source;

(b) analyzing the samples using mathematical means to produce a rate of change of the absolute value of said external energy source voltage and a predicted value of said external energy source voltage as it will exist after said preset charge pulse period has expired;

(c) if the absolute value of said bus voltage is increasing, accessing said switching means to connect a group of cell sets which have a terminal voltage less than or equal to the last sample taken of said external energy source voltage whereby electrical current will flow from said external energy source to charge said group of cell sets;

(d) if the absolute value of said external energy source voltage is decreasing, accessing said switching means to connect a group of cell sets with a terminal voltage less than or equal to said predicted value of said external energy source voltage whereby during said charge pulse period electrical current will remain flowing from said external energy source to charge said group of cell sets.

16. The power distribution unit of claim 10 where said electronic switching network means includes the use of power semiconductors which distribute the majority of the distribution unit energy, and where the body of said power semiconductors are attached using thermally conductive attachment means to a thermally dissipative portion of a plurality of battery cells within said pack, whereby a conventional heatsink is not required for said power semiconductors and a reduction in space requirements for said electronic switching means is obtained.

* * * * *